(12) United States Patent
Obi et al.

(10) Patent No.: US 7,914,154 B2
(45) Date of Patent: Mar. 29, 2011

(54) IMAGE PROJECTION DEVICE, IMAGE PROJECTION SCREEN AND IMAGE DISPLAY SYSTEM

(75) Inventors: Hiroshi Obi, Nara (JP); Hironori Tomita, Nara (JP); Akira Kurozuka, Osaka (JP); Osamu Kajino, Osaka (JP)

(73) Assignee: Panasonic Corporation, Osaka (JP)

( * ) Notice: Subject to any disclaimer, the term of this patent is extended or adjusted under 35 U.S.C. 154(b) by 409 days.

(21) Appl. No.: 12/282,892

(22) PCT Filed: Mar. 14, 2007

(86) PCT No.: PCT/JP2007/055102
§ 371 (c)(1),
(2), (4) Date: Sep. 15, 2008

(87) PCT Pub. No.: WO2007/108387
PCT Pub. Date: Sep. 27, 2007

(65) Prior Publication Data
US 2009/0091718 A1    Apr. 9, 2009

(30) Foreign Application Priority Data
Mar. 16, 2006    (JP) .................. 2006-072321

(51) Int. Cl.
*G03B 21/14* (2006.01)
*G03B 21/56* (2006.01)
(52) U.S. Cl. ........................ 353/79; 359/443
(58) Field of Classification Search ............ 353/71, 353/73; 359/443, 454, 459, 460
See application file for complete search history.

(56) References Cited

U.S. PATENT DOCUMENTS

| | | | |
|---|---|---|---|
| 7,457,035 B2 * | 11/2008 | Fricke et al. .................. 359/443 |
| 2001/0048406 A1 | 12/2001 | Masumoto et al. | |
| 2006/0290905 A1 | 12/2006 | May | |

FOREIGN PATENT DOCUMENTS

| | | |
|---|---|---|
| EP | 1 139 158 A2 | 10/2001 |
| JP | 05-197021 | 8/1993 |
| JP | 06-082915 | 3/1994 |
| JP | 2001-209342 | 8/2001 |
| JP | 2001-296609 | 10/2001 |
| JP | 2003-287802 | 10/2003 |
| JP | 2005-181731 | 7/2005 |
| JP | 2005-202029 | 7/2005 |
| JP | 2005-292423 | 10/2005 |
| JP | 2007-004177 | 1/2007 |

OTHER PUBLICATIONS

International Search Report for corresponding Application No. PCT/JP2007/055102 dated Jun. 26, 2007.

* cited by examiner

*Primary Examiner* — Thanh X Luu
(74) *Attorney, Agent, or Firm* — Renner, Otto, Boisselle & Sklar, LLP

(57) ABSTRACT

An image projector according to the present invention includes a first light source that emits visible light and a second light source that emits invisible light and projects the visible light and the invisible light onto a screen. The screen includes a material, at least one of the visible light reflectance, transmittance and absorbance of which changes when irradiated with the invisible light projected. The image projector further includes a modulating section for modulating the intensities of the visible light and invisible light based on an image signal and a control section for controlling the modulating section.

13 Claims, 16 Drawing Sheets

(a)

(b)

(c)

(a)

(b)

(a)

(b)

(c)

IMAGE PROJECTION DEVICE, IMAGE PROJECTION SCREEN AND IMAGE DISPLAY SYSTEM

TECHNICAL FIELD

The present invention relates to an image projector for presenting an image on a screen and also relates to the screen itself and an image display system including the projector and the screen. More particularly, the present invention relates to a technique for improving the image quality.

BACKGROUND ART

An image projector is designed to present an image on a screen by projecting light onto the screen. To improve the quality of the image presented that way, image projectors and screens have been modified from numerous angles. Specifically, as for image projectors, the image display (modulation) methods and modulators have been modified so as to increase the efficiency. As for an image projection screen on the other hand, a high-reflection, high-contrast screen has been proposed.

For example, Patent Document No. 1 discloses an image projection screen including a polarization selective reflective layer with a cholesteric liquid crystal structure that selectively reflects light with particular polarization components.

Meanwhile, Patent Document No. 2 discloses a wavelength selective reflective image projection screen, which includes optical thin films with a high refractive index and optical thin films with a lower refractive index that have been alternately stacked one upon the other and which exhibits a high reflection property with respect to incoming light rays falling within particular wavelength ranges (associated with the three primary colors of R, G and B).

Furthermore, Patent Document No. 3 discloses an image projector including a laser light source that emits light rays in two of the three primary colors of light and an excitation light source laser that emits an excited light ray and also discloses a wavelength converting image projection screen that includes a phosphor for converting the wavelength of the excited light ray into that of the other color.

Furthermore, Patent Document No. 4 discloses a reflective image projection screen, on which provided is a light absorbing layer made of light absorbing ink that absorbs light in the vicinity of 575 nm (at which human eyes have the highest relative luminosity factor) such that the projected image does not lose a good gray balance.

Patent Document No. 1: Japanese Patent Application Laid-Open Publication No. 2005-292423
Patent Document No. 2: Japanese Patent Application Laid-Open Publication No. 2005-202029
Patent Document No. 3: Japanese Patent Application Laid-Open Publication No. 2003-287802
Patent Document No. 4: Japanese Patent Application Laid-Open Publication No. 6-82915

DISCLOSURE OF INVENTION

Problems to be Solved by the Invention

When the color black needs to be presented on the screen, black is represented by projecting no light onto portions to present black. According to this technique, however, the color black would increase its luminance too much under intense external light to achieve a sufficient contrast ratio.

In order to overcome the problems described above, the present invention has an object of providing an image projector that can have a contrast ratio increased by minimizing such an intentional increase in the luminance of the color black even under intense external light, an image projection screen for use with the projector, and an image display system including the projector and the screen.

Means for Solving the Problems

An image projector according to the present invention includes a first light source that emits visible light and a second light source that emits invisible light and projects the visible light and the invisible light onto a screen. The screen includes a material, at least one of the visible light reflectance, transmittance and absorbance of which changes when irradiated with the invisible light projected. The image projector is characterized by further including: a modulating section for modulating the intensities of the visible light and invisible light based on an image signal; and a control section for controlling the modulating section.

In one preferred embodiment, the modulating section modulates the intensity of the invisible light based on a luminance signal associated with the image signal.

In this particular preferred embodiment, the image signal is RGB signals, and the control section converts the RGB signals into the luminance signal.

In another preferred embodiment, the modulating section modulates the intensity of the invisible light based on an inverted luminance signal, which is obtained by inverting a luminance signal associated with the image signal.

In this particular preferred embodiment, the image projector further includes a correcting section for correcting the inverted luminance signal.

In a specific preferred embodiment, the correcting section makes at least one correction selected from the group consisting of: a correction to the luminance level of the inverted luminance signal; the correction of truncating portions of the inverted luminance signal that have a predetermined luminance level or less; the correction of truncating portions of the inverted luminance signal that have predetermined intermediate luminance levels; and a gamma correction.

In another preferred embodiment, the image projector further includes at least one of an illuminance detecting section for detecting an illuminance at an image projection area and a temperature detecting section for detecting a temperature at the image projection area. The correcting section corrects the inverted luminance signal based on at least one of the illuminance and temperature at the image projection area.

In an alternative preferred embodiment, the image projector further includes at least one of an illuminance detecting section for detecting an illuminance at an image projection area and a temperature detecting section for detecting a temperature at the image projection area. The control section adjusts at least one of the energy and duration of the projected invisible light based on at least one of the illuminance and temperature at the image projection area.

In still another preferred embodiment, the image projector further includes: a scanning section with a reflective plane for reflecting and projecting the visible light and invisible light that have been emitted from the first and second light sources; and a driving section for driving the scanning section.

In yet another preferred embodiment, the material included in the screen is a photochromic compound.

In a specific preferred embodiment, the photochromic compound includes a transparent material.

In another specific preferred embodiment, the photochromic compound includes an opaque material.

In yet another preferred embodiment, at least one of the reflectance, transmittance and absorbance of the screen varies with the energy of the invisible light projected.

In yet another preferred embodiment, at least one of the reflectance, transmittance and absorbance of the screen varies with the duration of the invisible light projected.

In yet another preferred embodiment, the screen includes the material on the projection side thereof and/or its reverse side.

An image display system according to the present invention is characterized by comprising the image projector and the screen described above.

A screen according to the present invention is characterized by including a material, at least one of the reflectance, transmittance and absorbance of which changes with respect to visible light when irradiated with invisible light projected.

In one preferred embodiment, the material included in the screen is a photochromic compound.

In a specific preferred embodiment, the photochromic compound includes a transparent material.

In another specific preferred embodiment, the photochromic compound includes an opaque material.

In another preferred embodiment, at least one of the reflectance, transmittance and absorbance of the screen varies with the energy of the invisible light projected.

In yet another preferred embodiment, at least one of the reflectance, transmittance and absorbance of the screen varies with the duration of the invisible light projected.

In yet another preferred embodiment, the screen includes the material on the projection side thereof and/or its reverse side.

Effects of the Invention

An image projector according to the present invention includes a first light source that emits visible light and a second light source that emits invisible light. A screen includes a material, at least one of the visible light reflectance, transmittance and absorbance of which changes when irradiated with the invisible light projected. The image projector presents an image on the screen by projecting the visible light and invisible light onto the screen with their intensities modulated based on an image signal. By projecting the invisible light onto an area of the screen where the color black needs to be represented, that area comes to have an appropriate property to represent black. As a result, a high-contrast image can be presented with the unwanted increase in the luminance of the color black minimized even under intense external light.

In one preferred embodiment, the screen includes a photochromic compound. The photochromic effect is an optical modulation effect produced by a material, and therefore, ensures high reliability and yet needs no maintenance. Also, if an opaque photochromic compound is used, a layer of that photochromic compound can also function as a layer with a reflective image projection screen structure.

In another preferred embodiment, the light source may be a lamp such as a xenon lamp or an LED lamp or a semiconductor light source. Not just visible light but also invisible light are modulated based on a luminance signal associated with the same image signal. For example, invisible light is modulated based on an inverted luminance signal, which is obtained by inverting the luminance signal. As a result, invisible light with an appropriate intensity to present an image can be projected.

In still another preferred embodiment, the image signal may be an RGB signal and a luminance signal may be generated by converting the RGB signal. Thus, the luminance signal can be obtained based on various image signals.

In yet another preferred embodiment, by either correcting the inverted luminance signal or adjusting the energy and duration of the incident invisible light based on the illuminance and temperature of an image projection area, the image can be projected adaptively according to the state of the image projection area.

Figure 1:
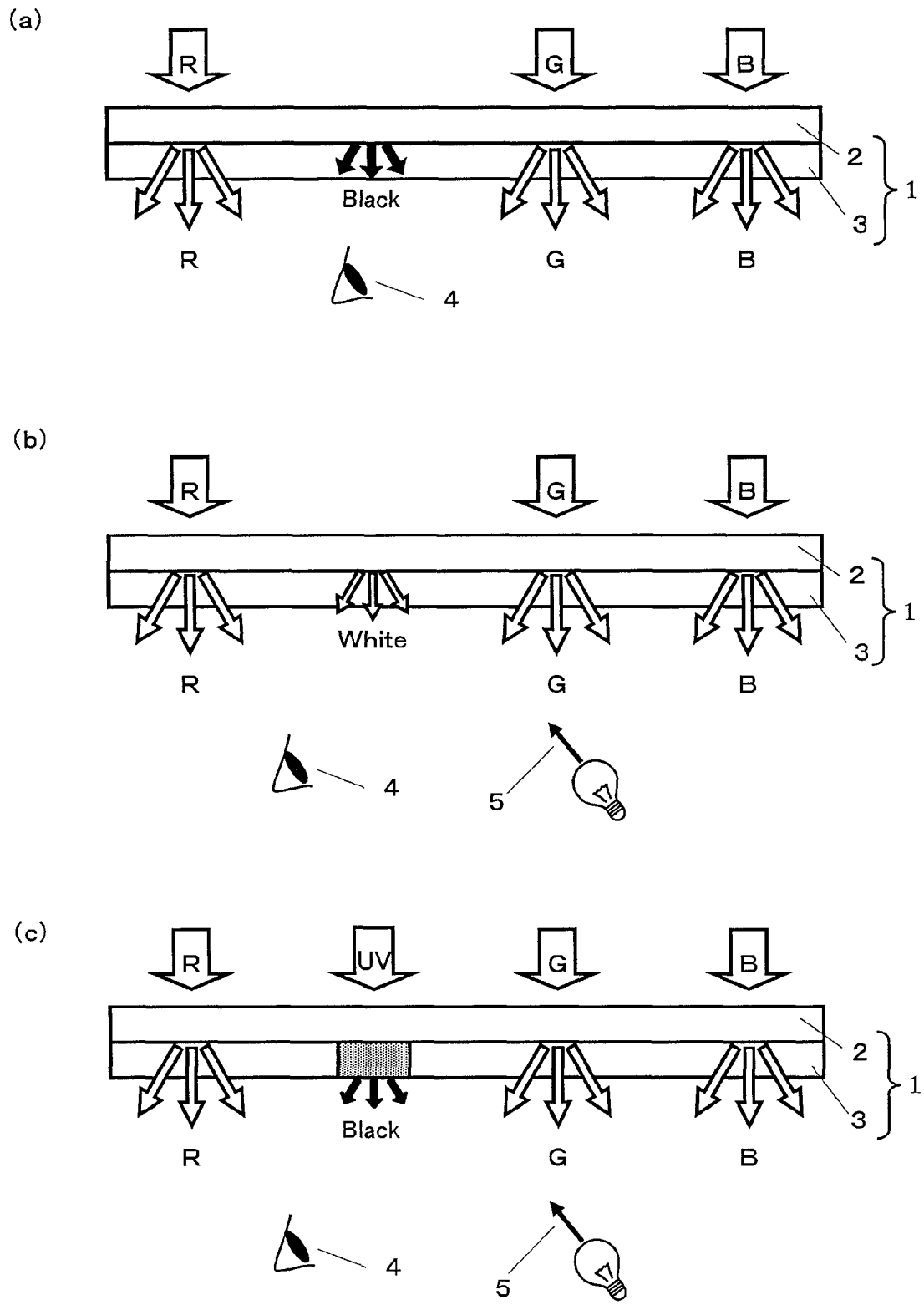
FIGS. 1(a) through 1(c) illustrate a transmissive image projection screen as a first preferred embodiment of the present invention.

DESCRIPTION OF REFERENCE NUMERALS 1 transmissive image projection screen
2, 12, 15 base material layer
3, 13, 16 photochromic compound layer
4 pupil
5 external light
7 Fresnel lens
8 lenticular lens
9 light absorbing section
11, 14 reflective image projection screen
21, 51 visible light source
22, 52 collimator lens
23 visible light source spatial modulator
24, 53 dichroic prism
25, 54 invisible light source
26, 55 beam splitter
27 projection lens
28, 59 image signal
29, 39, 60, 67 control section
30 spatial modulator driving section
31 R filter
32 G filter
33 B filter
34 invisible light source spatial modulator
35, 65 projection area
36, 66 image projection screen
37 luminance signal
38 inverted luminance signal
40, 68 illuminance detector
41, 69 temperature detector
42, 70 inverted luminance signal correcting section
56 scanning section
57 projected beam
58 aperture
61 light source modulator
62 driving section
63 angular displacement signal
64 beam trajectory
100, 101, 102, 103 image projector

BEST MODE FOR CARRYING OUT THE INVENTION

Hereinafter, preferred embodiments of the present invention will be described with reference to the accompanying drawings. It should be noted that any pair of components shown in multiple drawings and having substantially the same function will be identified by the same reference numeral. And once a component has been described, the description of its counterpart will be omitted herein to avoid redundancies.

Embodiment 1

FIG. 1 illustrates a transmissive image projection screen 1 as a first preferred embodiment of the present invention. Specifically, FIG. 1(a) Illustrates how the transmissive image projection screen 1 looks when used in a dark place. FIG. 1(b) illustrates how the transmissive image projection screen 1 looks when used in a light place. And FIG. 1(c) illustrates how the transmissive image projection screen 1 looks when used in a light place with invisible light projected. The transmissive image projection screen 1 may be used for a rear projection TV set, for example.

Figure 2:
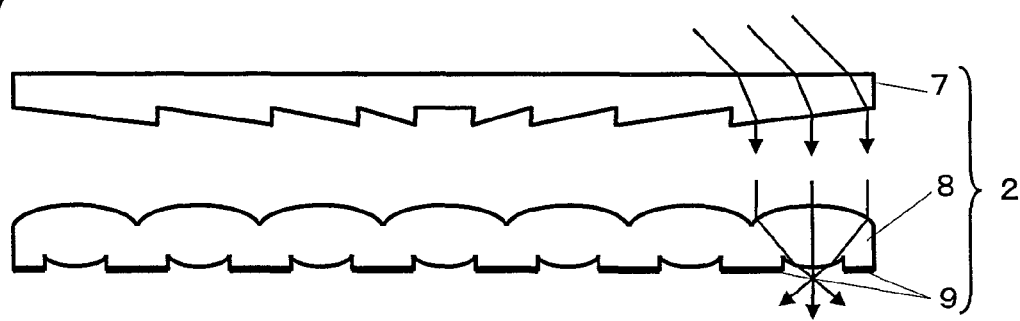
FIG. 2 illustrates a base material layer for the transmissive image projection screen as the first preferred embodiment of the present invention.
Figure 3:
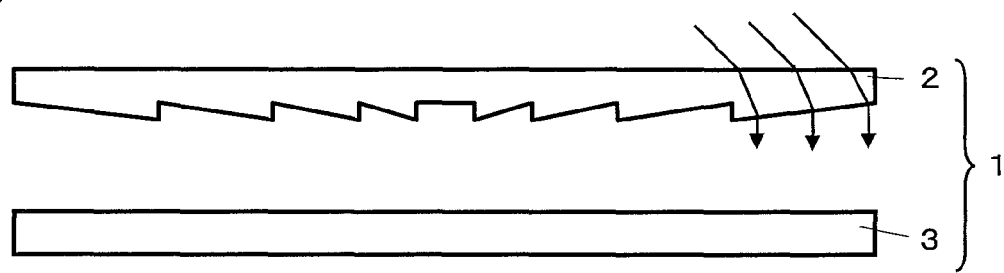
FIG. 3 illustrates another transmissive image projection screen according to the first preferred embodiment of the present invention.

FIG. 2 illustrates a base material layer for the transmissive image projection screen 1. FIG. 3 illustrates a transmissive image projection screen 1 with a different structure from the one shown in FIG. 2.

As shown in FIG. 1, the transmissive image projection screen 1 includes a base material layer 2 and a photochromic compound layer 3. The base material layer 2 may have a structure in which a layer with a Fresnel lens 7, a layer with a lenticular lens 8, and a layer with light absorbing portions 9 are stacked one upon the other as shown in FIG. 2, for example.

The photochromic compound layer 3 includes a transparent material and transmits projected visible light beams with high efficiency. In this example, the visible light includes light beams in red (R), green (G) and blue (B), which are the three primary colors of light. And the light beam in the three primary colors will sometimes be referred to herein as "RGB light beams". By combining the RGB light beams with each other, an image is produced. It should be noted that the visible light for use in the present invention does not have to consist of RGB light beams but could include light beams in other colors such as cyan, magenta and yellow.

The photochromic compound layer 3 reacts to an ultraviolet (UV) light beam, which is an invisible light beam, and comes to have a decreased reflectance and an increased absorbance with respect to visible light. One side of this transmissive image projection screen 1 on which the viewer is supposed to view the projected image with his or her pupils 4 will be referred to herein as a "front side". In that case, the visible light and invisible light beams are projected from over the reverse side of the screen 1 as shown in FIG. 1(a), for example.

As shown in FIG. 1(a), an area on the transmissive image projection screen 1 in which an image in black or in a color almost as dark as black is going to be presented is irradiated with no or almost no RGB light beams. As a result, such an image in black or almost black is presented in a dark place. In a light place on the other hand, an image presented in such an area not irradiated with the RGB light beams comes to have an excessive luminance due to the reflection (White) of the external light 5 (such as illumination) that has been incident on the front side of the screen 1 as shown in FIG. 1(b).

As shown in FIG. 1(c), when the transmissive image projection screen 1 is irradiated with the RGB light beams and the UV light, a portion of the photochromic compound layer 3 in the UV irradiated area reacts to the UV light, and comes to have a decreased reflectance and an increased absorbance with respect to visible light. If the pixels that are presenting such an image in black or in almost black correspond to the area irradiated with the UV light, then the external light 5 that has been incident on that area is absorbed into the photochromic compound layer 3. As a result, the intensity of the external light 5 reflected decreases, and the increase in luminance can be minimized in the area where the image needs to be presented in black.

Thus, according to this preferred embodiment, it is possible to prevent the external light 5 from increasing the luminance too much on an area where black needs to represented on the screen. As a result, the contrast ratio can be increased even in a light place.

It should be noted that the image projection screen does not have to have the structure described above. The two-layer structure consisting of the layer with the lenticular lens 8 and the layer with the light absorbing portions 9 as shown in FIG.

2 may be replaced with a photochromic compound layer 3 as shown in FIG. 3. If the two-layer structure consisting of the layer with the lenticular lens 8 and the layer with the light absorbing portions 9 is no longer necessary, then there is no need to make such a structure or adjust its position with respect to the Fresnel lens 7, thus simplifying the manufacturing process significantly.

Also, in the transmissive image projection screen 1 shown in FIG. 1, the photochromic compound layer 3 is provided only on the front side of the screen. However, another photochromic compound layer 3 may also be provided on the reverse side, too. In a rear projection TV, the presence of visible light (i.e., stray light) other than image display beams generated inside the housing of the TV constitutes a factor in the decrease in the contrast ratio of the projected image. For that reason, by providing the additional photochromic compound layer 3 on the reverse side of the screen 1 (i.e., the side that faces the inside of the housing), such stray light can be absorbed.

Examples of preferred photochromic compounds include spiropyran compounds, spirooxazine compounds, fulgide compounds, diarylethene compounds, and azobenzene compounds. The photochromic compound layer includes at least one of these photochromic compounds and a binder resin for applying or mixing the photochromic compound. As the material of the binder resin, a material that has good transparency and that does not affect the reaction of the photochromic compound is preferably used.

Hereinafter, it will be described how the photochromic compound layer gains and loses colors. The photochromic compound layer gains a color when irradiated with UV light but loses the color when irradiated with visible light. The visible light for use to make the photochromic compound layer lose the color has been projected from an image display device in order to present an image. In the following example, the color is supposed to be gained and lost with UV light and visible light. However, the UV light could be replaced with an infrared ray.

An area (or pixels) where an image needs to be presented in black or in a dark color is irradiated with UV light and a photochromic compound layer displays a grayscale (black) associated with the intensity of the incident light. When that dark area is irradiated with visible light and starts to increase its luminance, the photochromic compound layer loses its color.

The timing to lose the color is controllable by setting the intensity of the visible light, which causes the photochromic compound layer to lose its color, to a predetermined value. A grayscale display is maintained until the target area is irradiated with visible light with the predetermined intensity. Also, to maintain the grayscale display, that area is preferably irradiated with UV light either periodically or continuously.

The grayscales may be displayed as follows. For example, if the photochromic compound layer gains cyan, yellow and magenta evenly according to the intensity of the incident light, the photochromic compound layer comes to have the color black as a result of subtractive mixture (i.e., cyan+yellow+magenta=black).

Optionally, the photochromic compound layer may gain a color with heat and may lose the color with light. If the image projector and the screen can share the same piece of image information in common, the photochromic compound layer can gain a color by depositing a transparent conductive film on the photochromic compound layer, supplying current to the transparent conductive film and making the conductive film generate heat. The photochromic compound layer can lose the color by being irradiated with visible light. In this case, a transparent electrode (i.e., a transparent conductive film plus electrode) is arranged either one side (front or reverse side) of the photochromic compound layer or both sides thereof. The spiropyran compound may gain a color with heat, for example.

Furthermore, if the image projector and the screen can share the same piece of image information in common, the screen can be made to gain and lose a color by utilizing an electrochromic effect.

A rear projection screen may have one of the following structures (1) through (8):

(1) base material/photochromic compound layer/invisible light absorbing film;

(2) base material/photochromic compound layer/invisible light absorbing film/invisible light reflecting film;

(3) base material/transparent electrode/photochromic compound layer/invisible light absorbing film;

(4) base material/transparent electrode/photochromic compound layer/invisible light absorbing film/invisible light reflecting film;

(5) base material/photochromic compound layer/transparent electrode/invisible light absorbing film;

(6) base material/photochromic compound layer/transparent electrode/invisible light absorbing film/invisible light reflecting film;

(7) base material/transparent electrode/photochromic compound layer/transparent electrode/invisible light absorbing film; and (8) base material/transparent electrode/photochromic compound layer/transparent electrode/invisible light absorbing film/invisible light reflecting film In these eight structures, the basic ones are (1) and (2). In the other six structures (3) to (8), the positions of the transparent electrode are changed. Also, the structures (3) through (8) are screen structures of which the photochromic compound layer gains a color with heat and loses the color with light. To make a screen structure that uses an electrochromic effect, the photochromic compound layer may be replaced with an electrochromic compound layer. Optionally, a screen structure that uses both the photochromic effect and the electrochromic effect may be adopted.

In the rear projection screen with the structure (1), the invisible light absorbing film needs to have such a property as to absorb (i.e., not transmit) the invisible light that has come from an image projector and the invisible light component of external light. That is to say, the invisible light absorbing film is appropriately designed so as to absorb the invisible light coming from the image projector or the invisible light component of the external light that has the higher luminous intensity. For example, the invisible light absorbing film may be designed with taken into account the fact that an ultraviolet ray coming from a normal fluorescent lamp has a luminous intensity of several tens of $\mu W/cm^2$ and that an ultraviolet ray coming from the sun through the window glass when it is fine has a luminous intensity of 100 $\mu W/cm^2$ or less (which varies significantly according to the thickness and the type of the glass).

In the rear projection screen with the structure (2), the invisible light absorbing film needs to have such a property as to absorb (i.e., not transmit) the invisible light that has come from an image projector. Thus, the invisible light absorbing film is appropriately designed based on the luminous intensity of the invisible light coming from the image projector. Also, in the rear projection screen with the structure (2), the invisible light absorbing film needs to have such a property as to reflect (i.e., not transmit) the invisible light component of external light. That is why the invisible light absorbing film preferably has such a property as to totally reflect the invisible light component of the external light. But the invisible light absorbing film could transmit the external light as long as its luminous intensity is so low that almost no photochromic effect is produced in the photochromic compound layer.

Examples of photochromic compounds with properties changing with the temperature include spiropyran compounds and spirooxazine compounds.

Also, a diarylethene compound is used as a recording material for an optical disc and responds to light so quickly that it is effective to apply it to presenting a moving picture. Meanwhile, as quick response is not required in presenting a still picture, a material with slow response may also be used.

Furthermore, the invisible light that causes a reaction of the photochromic compound layer 3 may also be near-infrared light or near-ultraviolet light, not just ultraviolet light.

Furthermore, if the photochromic compound layer 3 is protected with a film, for example, and easily portable, then the photochromic compound layer 3 may be superposed on either a transmissive image projection screen that has already been installed or a frosted glass plate, a diffusion sheet or a transparent glass plate with a smooth surface and with an attached diffuse sheet, which can substitute for a transmissive image projection screen.

Also, if the photochromic compound is a material that can be applied easily, the compound could be applied either with a spray or as a liquid.

Embodiment 2

Figure 4:
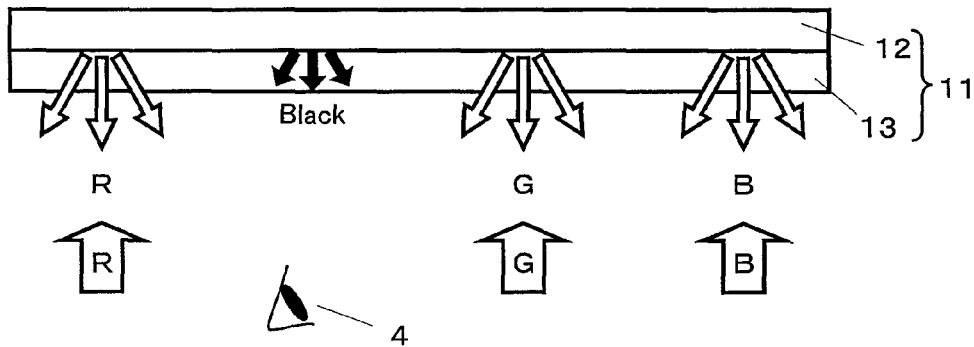
FIGS. 4(a) through 4(c) illustrate a reflective image projection screen as a second preferred embodiment of the present invention.
Figure 4:
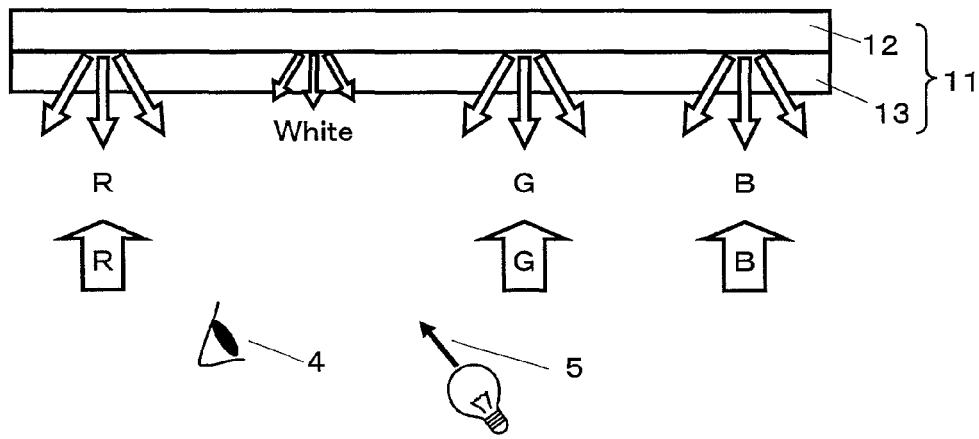
Figure 4:
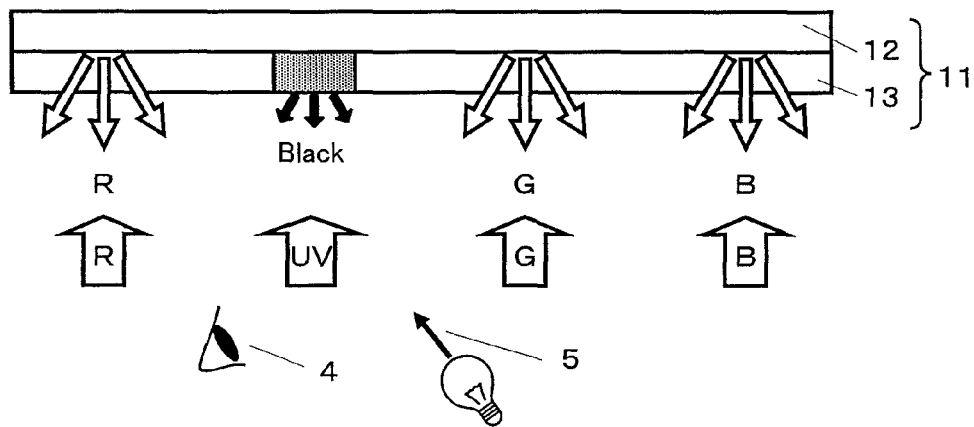

FIG. 4 illustrates a reflective image projection screen 11 as a second preferred embodiment of the present invention. Specifically, FIG. 4(a) illustrates how the reflective image projection screen 11 looks when used in a dark place. FIG. 4(b) illustrates how the reflective image projection screen 11 looks when used in a light place. And FIG. 4(c) illustrates how the reflective image projection screen 11 looks when used in a light place with invisible light projected. The reflective image projection screen 11 may be used for a projector, for example.

As shown in FIG. 4, the reflective image projection screen 11 includes a base material layer 12 and a photochromic compound layer 13. The base material layer 12 may have a projector screen structure in white and with an uneven surface. The photochromic compound layer 13 includes a transparent material and transmits visible light beams with high efficiency. The photochromic compound layer 13 reacts to an ultraviolet (UV) light beam, which is an invisible light beam, and comes to have a decreased transmittance and an increased absorbance with respect to visible light. One side of this reflective image projection screen 11 on which the viewer is supposed to view the projected image with his or her pupils 4 will be referred to herein as the "front side" of the screen 11. In that case, the RGB light beams and the UV light are projected from the front side of the screen 11.

As shown in FIG. 4(a), an area on the reflective image projection screen 11 in which an image in black or in a color almost as dark as black is going to be presented is irradiated with no or almost no RGB light beams. As a result, such an image in black or almost black is presented in a dark place. In a light place on the other hand, an image presented in such an area not irradiated with the RGB light beams comes to have an excessive luminance due to the reflection (White) of the external light 5 that has been incident on the front side of the screen 11 as shown in FIG. 4(b).

As shown in FIG. 4(c), when the reflective image projection screen 11 is irradiated with the RGB light beams and the UV light, a portion of the photochromic compound layer 13 in the UV irradiated area reacts to the UV light, and comes to have a decreased transmittance and an increased absorbance with respect to visible light. If the pixels that are presenting such an image in black or in almost black correspond to the area irradiated with the UV light, then the external light 5 that has been incident on that area is absorbed into the photochromic compound layer 13. As a result, the intensity of the external light 5 reflected decreases, and the increase in luminance can be minimized in the area where the image needs to be presented in black.

Thus, according to this preferred embodiment, it is possible to prevent the external light 5 from increasing the luminance too much on an area where black needs to represented on the screen. As a result, the contrast ratio can be increased even in a light place.

The image projection screen does not have to have the structure described above. For example, a dual reflective image projection screen, one side (i.e., front side) of which is a white screen that prioritizes the luminance of light reflected from the screen and the other side (i.e., reverse side) of which is a gray screen that prioritizes the contrast ratio of the image, could also be used. According to the present invention, however, just one screen surface can function both as the luminance-first screen and as the contrast-first screen. That is to say, the properties of the screen can be changed according to the intended application.

A front projection screen may have one of the following structures (1) through (4):
 (1) base material/photochromic compound layer/invisible light absorbing film;
 (2) base material/transparent electrode/photochromic compound layer/invisible light absorbing film;
 (3) base material/photochromic compound layer/transparent electrode/invisible light absorbing film; and
 (4) base material/transparent electrode/photochromic compound layer/transparent electrode/invisible light absorbing film In these four structures, the basic one is (1). In the other three structures (2) to (4), the positions of the transparent electrode are changed. Also, the structures (2) through (4) are screen structures of which the photochromic compound layer gains a color with heat and loses the color with light.

A threshold value is set for the invisible light absorbing film of a front projection screen such that the image projector projects invisible light, of which the intensity is equal to or greater than the threshold value. That threshold value may be appropriately determined by the degree of the photochromic effect to be produced when the invisible light projected from the image projector is transmitted through the invisible light absorbing film.

Furthermore, the invisible light that causes a reaction of the photochromic compound layer 13 may also be near-infrared light or near-ultraviolet light, not just ultraviolet light.

Furthermore, if the photochromic compound layer 13 is protected with a film, for example, and easily portable, then the photochromic compound layer 13 may be superposed on either a reflective image projection screen that has already been installed or a white board or a wall with a smooth surface, which can substitute for a reflective image projection screen.

Also, if the photochromic compound is a material that can be applied easily, the compound could be applied either with a spray or as a liquid.

Embodiment 3

Figure 5:
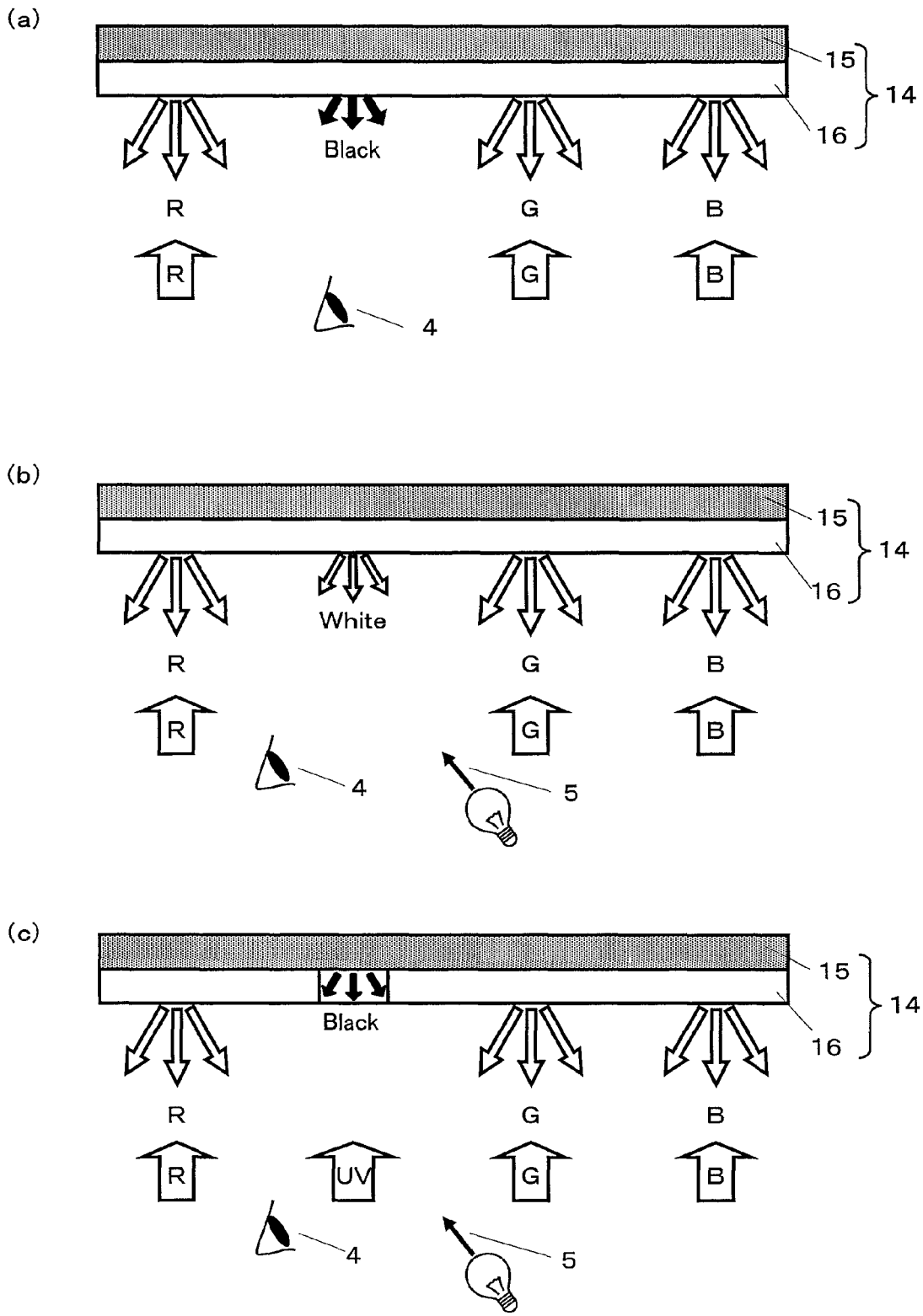
FIGS. 5(a) through 5(c) illustrate a reflective image projection screen as a third preferred embodiment of the present invention.

FIG. 5 illustrates a reflective image projection screen 14 as a third preferred embodiment of the present invention. Specifically, FIG. 5(a) illustrates how the reflective image projection screen 14 looks when used in a dark place. FIG. 5(b) illustrates how the reflective image projection screen 14 looks when used in a light place. And FIG. 5(c) illustrates how the reflective image projection screen 14 looks when used in a light place with invisible light projected. The reflective image projection screen 14 may be used for a projector, for example.

As shown in FIG. 5, the reflective image projection screen 14 includes a base material layer 15 and a photochromic compound layer 16. The base material layer 15 may have the color black, for example. And the photochromic compound layer 16 includes an opaque material and may have a projector screen structure in white and with an uneven surface. The visible light beam is reflected from the photochromic compound layer 16 highly efficiently. The photochromic compound layer 16 reacts to an ultraviolet (UV) light beam, which is an invisible light beam, and comes to have a decreased reflectance and an increased transmittance with respect to visible light. One side of this reflective image projection screen 14 on which the viewer is supposed to view the projected image with his or her pupils 4 will be referred to herein as the "front side" of the screen 14. In that case, the RGB light beams and the UV light are projected from the front side of the screen 14.

As shown in FIG. 5(a), an area on the reflective image projection screen 14 in which an image in black or in a color almost as dark as black is going to be presented is irradiated with no or almost no RGB light beams. As a result, such an image in black or almost black is presented in a dark place. In a light place on the other hand, an image presented in such an area not irradiated with the RGB light beams comes to have an excessive luminance due to the reflection (White) of the external light 5 that has been incident on the front side of the screen 14 as shown in FIG. 5(b).

As shown in FIG. 5(c), when the reflective image projection screen 14 is irradiated with the RGB light beams and the UV light, a portion of the photochromic compound layer 16 in the UV irradiated area reacts to the UV light, and comes to have a decreased reflectance and an increased transmittance with respect to visible light. If the pixels that are presenting such an image in black or in almost black correspond to the area irradiated with the UV light, then the external light 5 that has been incident on that area is transmitted through the photochromic compound layer 16 and then reflected from the base material 15. Since the base material 15 is black, most of the incident light is absorbed and the color black is displayed there. As a result, the increase in luminance can be minimized in the area where the image needs to be presented in black.

Thus, according to this preferred embodiment, it is possible to prevent the external light 5 from increasing the luminance too much on an area where black needs to represented on the screen. As a result, the contrast ratio can be increased even in a light place.

Furthermore, the invisible light that causes a reaction of the photochromic compound layer 16 may also be near-infrared light or near-ultraviolet beam, not just ultraviolet light.

Optionally, the color of the base material layer may also be gray, not just black.

Furthermore, if the photochromic compound layer 16 is protected with a film, for example, and easily portable, then the photochromic compound layer 16 may be superposed on either a contrast-first, reflective image projection screen that has already been installed or a blackboard or a dark-colored wall with a smooth surface and with no pattern or color unevenness, which can substitute for a reflective image projection screen.

Also, if the photochromic compound is a material that can be applied easily, the compound could be applied either with a spray or as a liquid.

Embodiment 4

Figure 6:
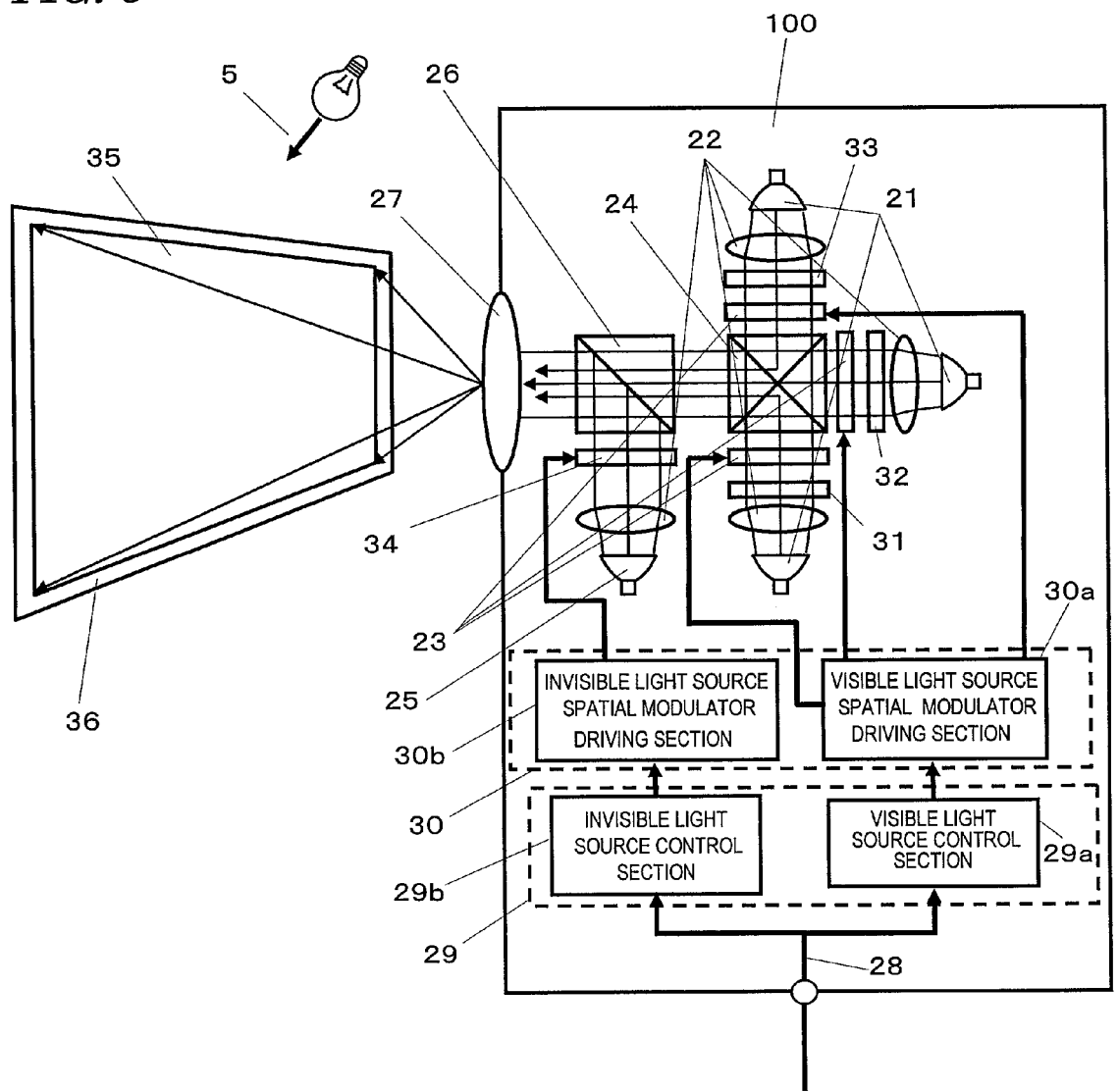
FIG. 6 illustrates an image display system as a fourth preferred embodiment of the present invention.

Hereinafter, an image display system will be described as another preferred embodiment of the present invention. FIG. 6 illustrates an image display system as a fourth preferred embodiment of the present invention. The image display system includes an image projector 100 and an image projection screen 36.

Figure 7:
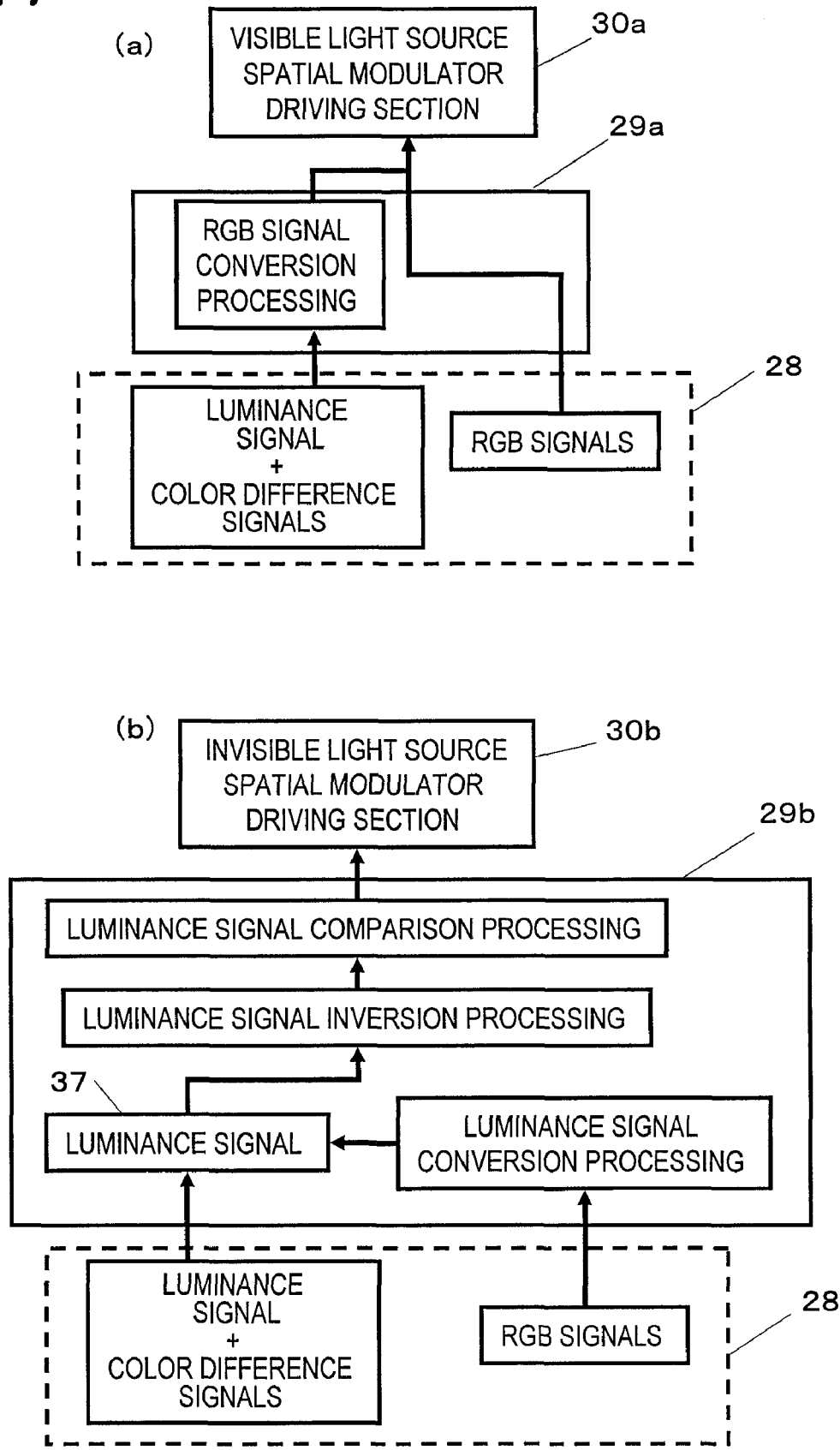
FIGS. 7(a) and 7(b) are flowcharts showing how a control section performs signal processing in the fourth preferred embodiment of the present invention.
Figure 8:
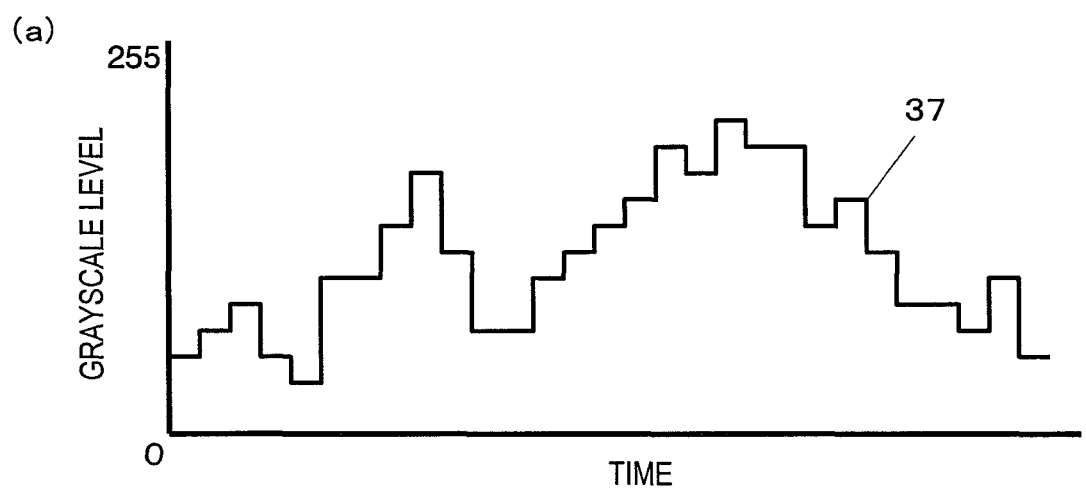
FIGS. 8(a) and 8(b) show a luminance signal and an inverted luminance signal according to the fourth preferred embodiment of the present invention.
Figure 8:
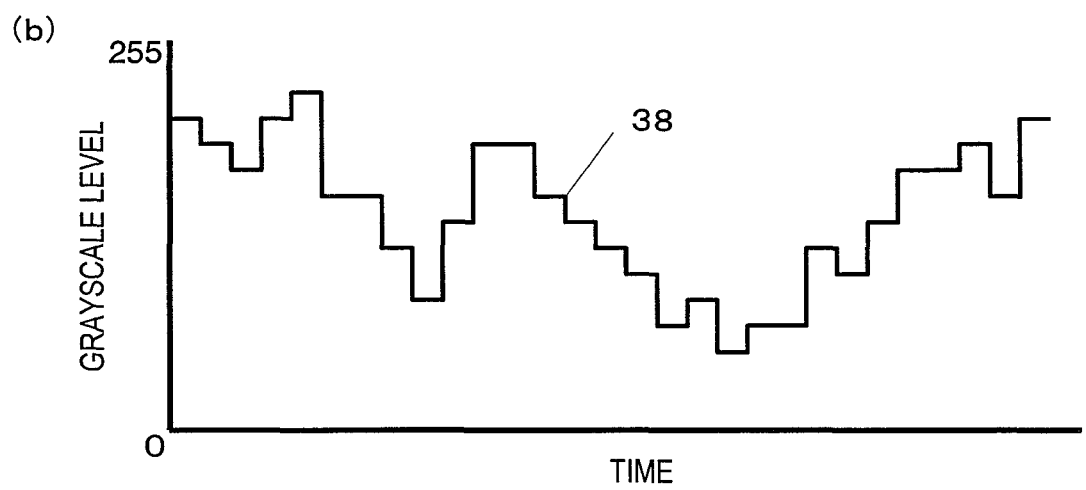

FIG. 7 shows the flows of signal processing performed by a control section 29. FIG. 8 shows a luminance signal 37 of an image signal 28 and an inverted luminance signal 38 generated by subjecting the luminance signal 37 to inversion processing.

As shown in FIG. 6, the image projector 100 includes visible light sources 21, collimator lenses 22, an R filter 31, a G filter 32, a B filter 33, spatial modulators 23 for the visible light sources, a dichroic prism 24, an invisible light source 25, a spatial modulator 34 for the invisible light source, a beam splitter 26, a projection lens 27, a control section 29 and a spatial modulator driving section 30.

The control section 29 includes a visible light source control section 29a and an invisible light source control section 29b. The spatial modulator driving section 30 includes a visible light source spatial modulator driving section 30a and an invisible light source spatial modulator driving section 30b.

The visible light sources 21 emit visible light beams and the invisible light source 25 emits invisible light. The spatial modulators 23, 24 and the spatial modulator driving section 30 modulate the intensities of the visible light and invisible light based on an image signal. The spatial modulators 23, 24 and the spatial modulator driving section 30 may be collectively referred to herein as a "modulating section". The control section 29 controls the operation of the spatial modulator driving section 30 based on the image signal, thereby allowing the spatial modulators 23 and 24 to modulate the intensities of the visible light and invisible light.

The visible light beams that have been emitted from the three visible light sources 21 associated with R, G and B, respectively, are converged by their associated collimator lenses 22 and then transmitted through the R, G and B filters 31, 32 and 33, respectively, thereby producing R, G and B light beams. These R, G and B light beams are modulated by the visible light source spatial modulators 23 (which may be transmissive liquid crystal cells, for example) and then combined together by the dichroic prism 24. Meanwhile, the invisible light beam emitted from the invisible light source 25 is converged by the collimator lens 22, modulated by the invisible light source spatial modulator 34 (which may be a transmissive liquid crystal cell, for example), and then combined by a beam splitter 26 with the combined visible light beam that has been produced by the dichroic prism 24, thereby producing a projected beam. Then the projected beam is projected through the projection lens 27 onto an image projection screen 36, thereby producing an image on a projection area 35.

The image signal 28 representing an image to present is input to the control sections 29a and 29b, which output a control signal, associated with the image signal 28, to the spatial modulator driving sections 30a and 30b, respectively. The spatial modulator driving sections 30a and 30b drive the spatial modulators 23 and 34 in accordance with the control signal, thereby making the spatial modulators 23 modulate the intensities of the visible light beams based on the image signal and making the spatial modulator 34 modulate the intensity of the invisible light beam based on the image signal 28.

The invisible light source control section 29b generates an inverted luminance signal by inverting the luminance signal of the image signal 28, and then outputs it as a control signal to the invisible light source spatial modulator driving section 30b.

Hereinafter, it will be described with reference to the signal processing flow shown in FIG. 7(a) how the visible light source control section 29a performs its signal processing.

If the image signal 28 is a video signal compliant with the normal NTSC (National Television System Committee) standard, a luminance signal, color difference signals (including an R-luminance signal and a B-luminance signal) and an audio signal are obtained. The luminance signal can be obtained by adding together the R, G and B signals at a predetermined ratio and is given by the following equation:

$$\text{Luminance signal} = 0.299*R + 0.587*G + 0.114*B \quad (1)$$

On the other hand, the respective color difference signals are given by:

$$R\text{-luminance signal} = 0.701*R - 0.587*G - 0.114*B \quad (2)$$

$$B\text{-luminance signal} = -0.299*R - 0.587*G + 0.886*B \quad (3)$$

The control section 29a performs the RGB signal conversion processing represented by these Equations (1) to (3), thereby producing the R, G and B signals, which are then input to the visible light source modulator driving section 30a.

On the other hand, if the image signal 28 is the R, G and B signals, these R, G and B signals are input to the visible light source modulator driving section 30a.

Next, it will be described with reference to the signal processing flow shown in FIG. 7(b) how the invisible light source control section 29b performs its signal processing.

If the image signal 28 is a video signal compliant with the normal NTSC standard, a luminance signal, color difference signals and an audio signal are obtained. The control section 29b subjects this luminance signal 37 to luminance signal inversion processing, thereby obtaining an inverted luminance signal, which is input to the invisible light source modulator driving section 30b.

On the other hand, if the image signal 28 is the R, G and B signals, the luminance signal is included in these R, G and B signals, and therefore, the luminance signal 37 can be obtained by adding the R, G and B signals together at the predetermined ratio represented by Equation (1). This luminance signal 37 is subjected to luminance signal inversion processing, thereby obtaining an inverted luminance signal, which is input to the invisible light source modulator driving section 30b.

Next, the luminance signal 37 and the inverted luminance signal 38 will be described with reference to FIG. 8.

FIG. 8(a) shows the luminance signal 37. In FIG. 8(a), the luminance signal 37 within a certain control time period (i.e., the period on the axis of abscissas shown in FIG. 8(a)) is represented by grayscale levels (or luminance levels) of 0 through 255.

FIG. 8(b) shows an inverted luminance signal 38 within the certain control time period. The inverted luminance signal 38 is obtained by inverting the luminance signal 37.

The image projection screen 36 (see FIG. 6) may include the components shown in FIG. 4, for example.

The image projection screen 36 includes a base material layer 12 for presenting an image by reflecting the light that has been projected by the image projector 100 and a photochromic compound layer 13 including a transparent material deposited on the surface of the base material layer 12.

The visible light beam projected by the image projector 100 is reflected by the base material layer 12 to present an image there. On the other hand, the invisible light beam projected by the image projector 100 causes a reaction of the photochromic compound layer 13, thereby decreasing the transmittance of the visible light and increasing the absorbance.

By combining this image projector 100 with the image projection screen 36, an image display system is established.

The intensities (i.e., radiation energies) and durations of the invisible light and visible light are preferably adjusted such that the photochromic compound layer gains a color responsive to the invisible light and loses the color responsive to the visible light in an appropriate response time and at appropriate color gain and loss levels. As shown in FIG. 7(b), the control section 29b not just stores a luminance signal representing the image to present and its preceding and succeeding luminance signals but also compares those luminance signals to each other (which is luminance signal comparison processing). If it turns out, as a result of the comparison, that a dark image continues to be presented at a certain location on the display for a predetermined amount of time or more, then the invisible light beam has its intensity and duration both increased. On the other hand, if a dark image is presented for just a short time at a certain location on the display, then the invisible light beam has its intensity and duration both decreased.

As described above, the image projector 100 includes not only the visible light sources 21 but also the invisible light source 25. The invisible light beam is combined with the visible light beams and the resultant combined beam is projected onto the image projection screen 36. The base material layer 12 presents an image represented by the visible light beams, while the invisible light beam causes a reaction of the photochromic compound layer 13, thereby decreasing the transmittance of the visible light and increasing the absorbance thereof. If the pixels that are presenting such an image in black or in almost black correspond to the area irradiated with the visible light that should have a decreased transmittance and an increased absorbance, then the external light 5 that has been incident on that area is absorbed into the photochromic compound layer 13. As a result, an image display system, in which increase in luminance caused by the external light 5 can be minimized in the area where the image needs to be presented in black and which has an increased contrast ratio, can be obtained.

As the spatial modulators for modulating light beams, not just the transmissive liquid crystal cells but also a reflective liquid crystal cell and an optical element called a "digital mirror device (DMD)" may be used as well. The digital mirror device presents an image by digitally tilting micromirrors that are arranged in a matrix pattern.

It should be noted that the optical system of the image projector 100 described above is just an example. The number of the light sources used and the collimator lenses, prism and other members may be modified in various manners.

Furthermore, the invisible light that causes a reaction of the photochromic compound layer 13 may also be near-infrared light or near-ultraviolet light, not just ultraviolet light.

Embodiment 5

Figure 9:
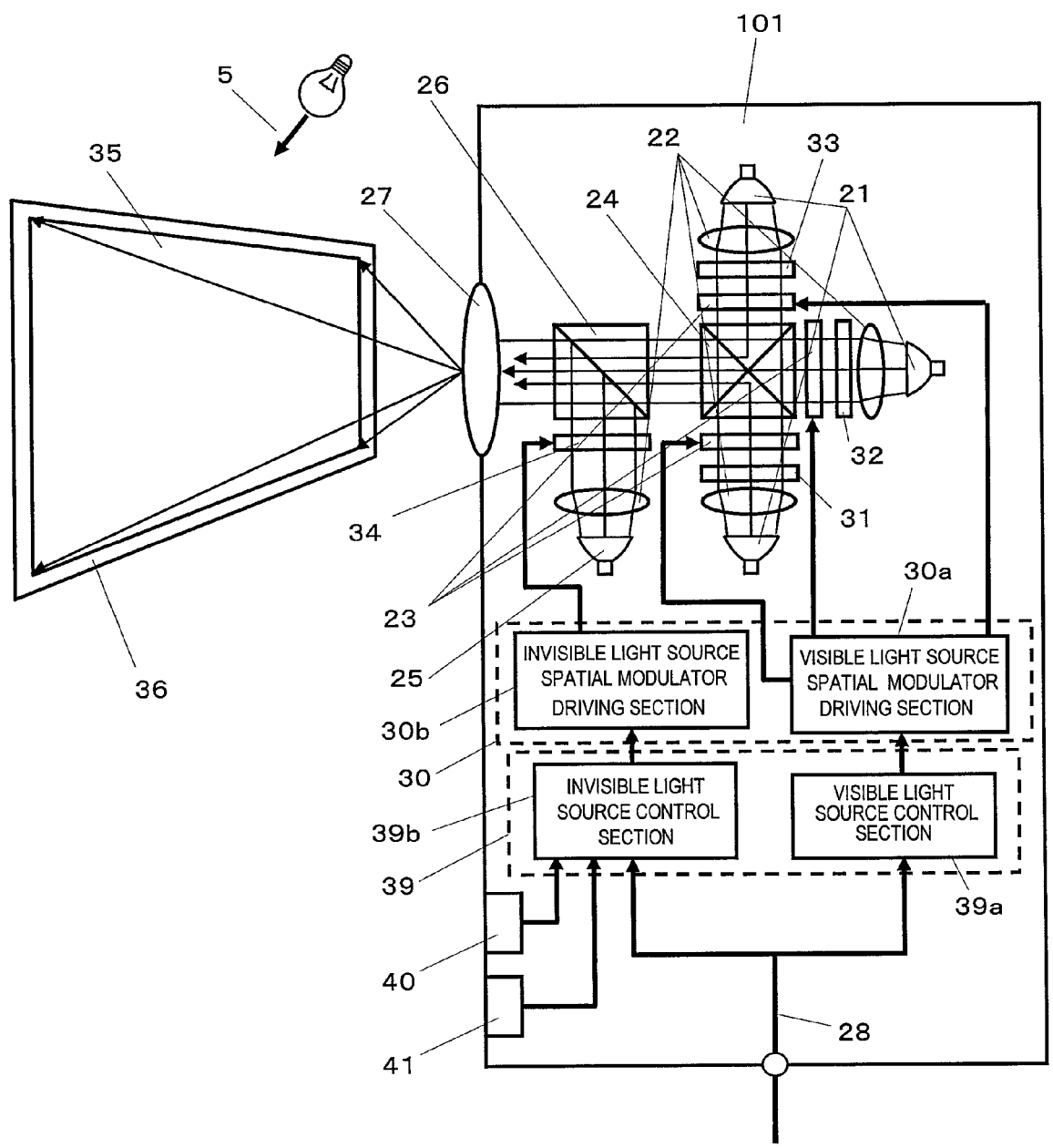
FIG. 9 illustrates an image display system as a fifth preferred embodiment of the present invention.
Figure 10:
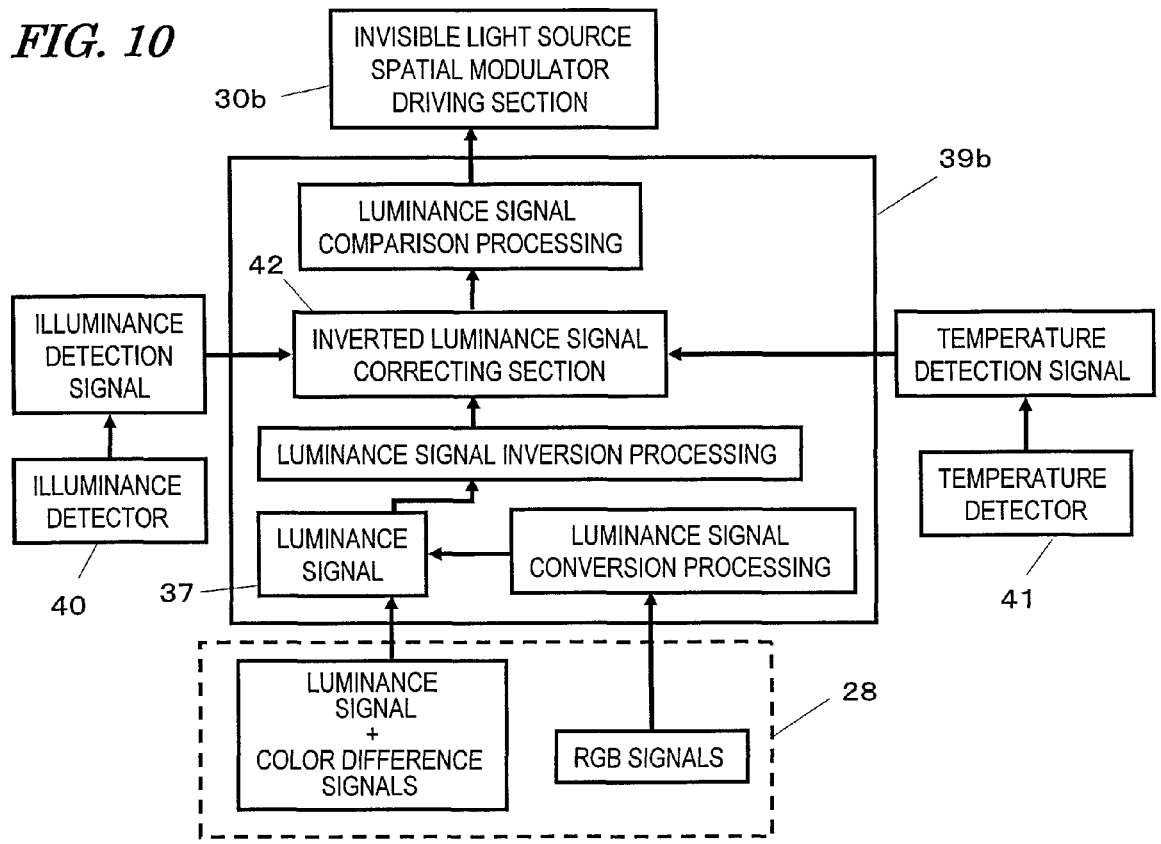
FIG. 10 is a flowchart showing how a control section performs signal processing in the fifth preferred embodiment of the present invention.
Figure 11:
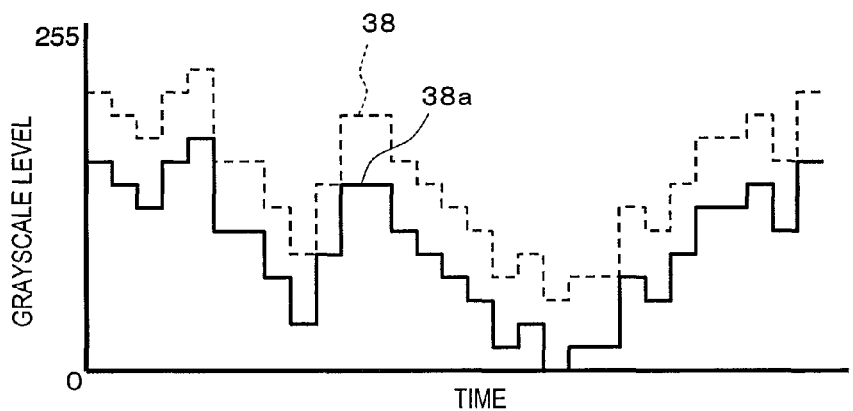
FIG. 11 shows how to correct the grayscale level of an inverted luminance signal in the fifth preferred embodiment of the present invention.

FIG. 9 illustrates an image display system as a fifth preferred embodiment of the present invention. FIG. 10 shows the flow of the signal processing to be performed by a control section 39. And FIG. 11 shows an inverted luminance signal yet to be corrected and a corrected inverted luminance signal.

Figure 12:
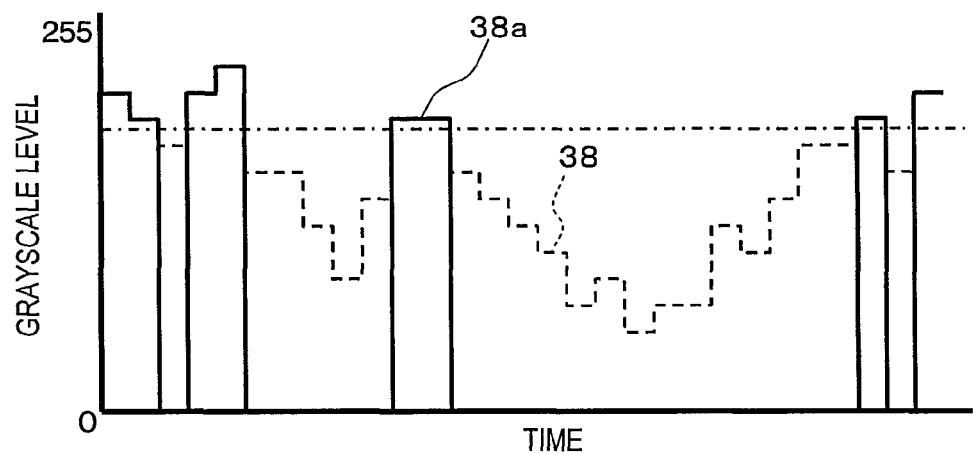
FIG. 12 shows how to make a correction of truncating some grayscale levels on the inverted luminance signal in the fifth preferred embodiment of the present invention.
Figure 13:
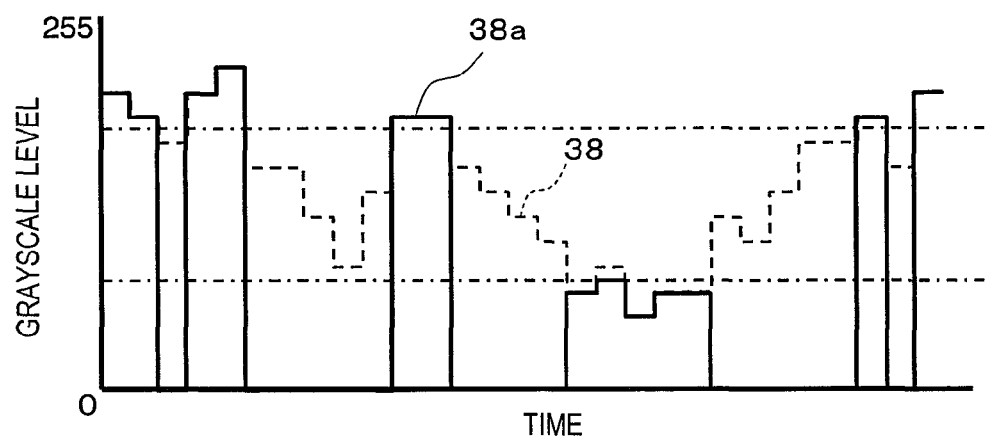
FIG. 13 shows how to make a correction of truncating intermediate grayscale levels on the inverted luminance signal in the fifth preferred embodiment of the present invention.
Figure 14:
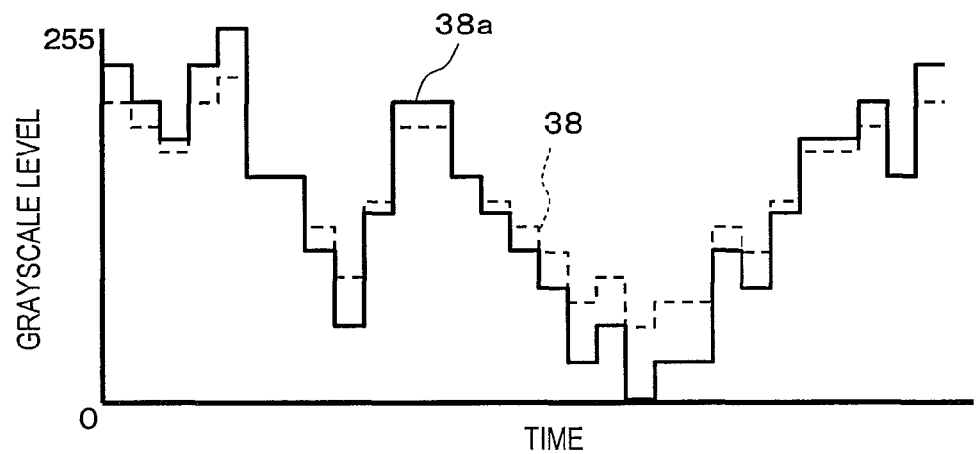
FIG. 14 shows how to make a gamma correction on the inverted luminance signal in the fifth preferred embodiment of the present invention.

FIG. 12 shows how to make a correction of truncating some of the inverted luminance signal. FIG. 13 shows how to make a correction of truncating intermediate grayscale levels on the inverted luminance signal. And FIG. 14 shows how to make a gamma correction on the inverted luminance signal.

The image projector 101 shown in FIG. 9 includes the components to be described below.

The visible light beams that have been emitted from multiple light sources 21 are converged by their associated collimator lenses 22 and then transmitted through R, G and B filters 31, 32 and 33, respectively, thereby producing R, G and B light beams. These R, G and B light beams are modulated by visible light source spatial modulators 23 and then combined together by a dichroic prism 24. Meanwhile, an invisible light beam emitted from an invisible light source 25 is converged by a collimator lens 22, modulated by an invisible light beam spatial modulator 34, and then combined by a light beam splitter 26 with the combined visible light beam that has been produced by a dichroic prism 24, thereby producing a projected beam. Then the projected beam is projected through a projection lens 27 onto an image projection screen 36, thereby producing an image on a projection area 35.

The control section 39 of the image projector 101 includes a visible light source control section 39*a* and an invisible light source control section 39*b*. The image signal 28 representing an image to present is input to the control sections 39*a* and 39*b*, which output a control signal, associated with the image signal 28, to spatial modulator driving sections 30*a* and 30*b*, respectively. The spatial modulator driving sections 30*a* and 30*b* drive the spatial modulators 23 and 34 in accordance with the control signal, thereby making the spatial modulators 23 modulate the intensities of the visible light beams based on the image signal and making the spatial modulator 34 modulate the intensity of the invisible light beam based on the image signal 28.

The invisible light source control section 39*b* generates an inverted luminance signal by inverting the luminance signal of the image signal 28, and then outputs it as a control signal to the invisible light source spatial modulator driving section 30*b*.

The image projector 101 further includes an illuminance detector 40 and a temperature detector 41. The illuminance detector 40 detects the illuminance around the image projection screen 36, as well as on the image projection area 35, and outputs an illuminance detection signal, representing the illuminance detected, to the invisible light source control section 39*b*.

On the other hand, the temperature detector 41 detects the temperature around the image projection screen 36, as well as on the image projection area 35, and outputs a temperature detection signal, representing the temperature detected, to the invisible light source control section 39*b*.

The illuminance detector 40 or the temperature detector 41 detects the illuminance or the temperature when the image projector 101 is turned ON, before the image is projected, and/or while the image is being projected.

The flow of the signal processing performed by the visible light source control section 39*a* is the same as that of the signal processing performed by the visible light source control section 29*a* as shown in FIG. 7(*a*). If the image signal 28 is a video signal compliant with the normal NTSC standard, a luminance signal, color difference signals (including an R-luminance signal and a B-luminance signal) and an audio signal are obtained. The luminance signal can be obtained by adding together the R, G and B signals at a predetermined ratio and is represented by Equation (1). On the other hand, the respective color difference signals are represented by Equations (2) and (3). The control section 39*a* performs the RGB signal conversion processing represented by these Equations (1) to (3), thereby producing the R, G and B signals, which are then input to the visible light source modulator driving section 30*a*.

On the other hand, if the image signal 28 is the R, G and B signals, these R, G and B signals are input to the visible light source modulator driving section 30*a*.

Next, it will be described with reference to the signal processing flow shown in FIG. 10 how the invisible light source control section 39*b* performs its signal processing.

The invisible light source control section 39*b* performs quite the same processing as the one that has already been described with reference to FIG. 7(*b*) until the luminance signal is inverted. If the image signal 28 is a video signal compliant with the normal NTSC standard, the luminance signal 37 is obtained. Thus, the control section 39*b* subjects this luminance signal 37 to luminance signal inversion processing, thereby obtaining an inverted luminance signal.

On the other hand, if the image signal 28 is the R, G and B signals, the luminance signal is included in these R, G and B signals, and therefore, the luminance signal 37 can be obtained by adding the R, G and B signals together at the predetermined ratio represented by Equation (1). This luminance signal 37 is subjected to luminance signal inversion processing, thereby obtaining an inverted luminance signal.

FIG. 8(*a*) illustrates the luminance signal 37 and FIG. 8(*b*) illustrates the inverted luminance signal 38.

The invisible light source control section 39*b* includes an inverted luminance signal correcting section 42. The inverted luminance signal 38 is input to the inverted luminance signal correcting section 42, where the grayscale levels are corrected, thereby obtaining an inverted luminance signal to drive the spatial modulator 34. Then, this inverted luminance signal is input to the invisible light source modulator driving section 30*b*. Hereinafter, the correction processing performed by the inverted luminance signal correcting section 42 will be described with reference to FIG. 11.

FIG. 11 shows an inverted luminance signal yet to be corrected and a corrected inverted luminance signal in a situation where the grayscale levels (i.e., luminance levels) are corrected within a certain control time period. In FIG. 11, the dashed curve represents the inverted luminance signal 38 before the grayscale levels are corrected, while the solid curve represents the inverted luminance signal 38*a* after the grayscale levels have been corrected. According to the illuminance detected by the illuminance detector 40, the grayscale levels are decreased uniformly by a predetermined magnitude.

The illuminance detection signal is output from the illuminance detector 40 to the inverted luminance signal correcting section 42, where the luminance levels (i.e., grayscale levels) of the inverted luminance signal to drive the spatial modulator 34 are corrected in accordance with the illuminance detection signal.

The temperature detection signal is output from the temperature detector 41 to the inverted luminance signal correcting section 42, where the luminance levels (i.e., grayscale levels) of the inverted luminance signal to drive the spatial modulator 34 are corrected in accordance with the temperature detection signal.

The image projection screen 36 (see FIG. 9) may include the components shown in FIG. 4, for example.

The image projection screen 36 includes a base material layer 12 and a photochromic compound layer 13 including a transparent material deposited on the surface of the base material layer 12.

The visible light beam projected by the image projector 101 is reflected by the base material layer 12 to present an image there. On the other hand, the invisible light beam projected by the image projector 101 causes a reaction of the photochromic compound layer 13, thereby decreasing the transmittance of the visible light and increasing the absorbance.

By combining this image projector 101 with the image projection screen 36, an image display system is established.

The intensities and durations of the invisible light and visible light are preferably adjusted such that the photochromic compound layer gains a color responsive to the invisible light and loses the color responsive to the visible light in an appropriate response time and at appropriate color gain and loss levels. As shown in FIG. 10, the control section 39b not just stores a luminance signal representing the image to present and its preceding and succeeding luminance signals but also compares those luminance signals to each other (which is luminance signal comparison processing). If it turns out, as a result of the comparison, that a dark image continues to be presented at a certain location on the display for a predetermined amount of time or more, then the invisible light beam has its intensity and duration both increased. On the other hand, if a dark image is presented for just a short time at a certain location on the display, then the invisible light beam has its intensity and duration both decreased.

As described above, the image projector 101 includes not only the visible light sources 21 but also the invisible light source 25. The invisible light beam is combined with the visible light beams and the resultant combined beam is projected onto the image projection screen 36. The base material layer 12 presents an image represented by the visible light beams, while the invisible light beam causes a reaction of the photochromic compound layer 13, thereby decreasing the transmittance of the visible light and increasing the absorbance thereof. If the pixels that are presenting such an image in black or in almost black correspond to the area irradiated with the visible light that should have a decreased transmittance and an increased absorbance, then the external light 5 that has been incident on that area is absorbed into the photochromic compound layer 13. As a result, an image display system, in which increase in luminance caused by the external light 5 can be minimized in the area where the image needs to be presented in black and which has an increased contrast ratio, can be obtained. In addition, according to this preferred embodiment, the inverted luminance signal correcting section 42 corrects the inverted luminance signal 38 appropriately according to the environment surrounding the projector, thereby further reducing the unwanted increase in the luminance of black portions on the screen and increasing the contrast ratio.

As the spatial modulators for modulating light beams, not just the transmissive liquid crystal cells but also a reflective liquid crystal cell or an optical element called a "digital mirror device (DMD)" may be used as well.

It should be noted that the optical system of the image projector 101 described above is just an example. The number of the light sources used and the collimator lenses, prism and other members may be modified in various manners.

Furthermore, the invisible light that causes a reaction of the photochromic compound layer 13 may also be near-infrared light or near-ultraviolet light, not just ultraviolet light.

The grayscale levels (luminance levels) are supposed to be corrected by decreasing the levels uniformly by a predetermined magnitude. However, this is just an example. Actually, as the grayscale levels are corrected according to the luminance around the image projection screen 36, as well as on the projection area 35, the grayscale levels may sometimes be increased uniformly by a predetermined magnitude.

Methods of correcting an inverted luminance signal include a correction of truncating portions of the inverted luminance signal that are equal to or lower than a predetermined luminance level, a correction of truncating only portions with predetermined intermediate luminance levels, and a gamma correction for correcting either a luminance level that exceeds a grayscale level or a luminance intermediate position. These correction processes performed by the inverted luminance signal correcting section 42 will be described with reference to FIGS. 12 through 14.

FIG. 12 shows the correction processing of truncating portions of the inverted luminance signal that are equal to or lower than a predetermined grayscale level (or luminance level) within a certain control time period. The one-dot chain indicates the predetermined grayscale level. The dashed curve indicates the inverted luminance signal 38 yet to be corrected. And the solid lines indicate the corrected, inverted luminance signal 38a. Since the portions that are equal to or lower than the predetermined grayscale level are truncated, the invisible light beam, which has had its intensity modulated with the inverted luminance signal 38a, gets projected only to pixels that represent an image in black or almost black. As a result, the transmittance of visible light can be decreased and the absorbance thereof can be increased.

FIG. 13 shows the correction processing of truncating portions of the inverted luminance signal with predetermined intermediate grayscale levels (or luminance levels) within a certain control time period. The predetermined intermediate grayscale levels are defined by the upper and lower one-dot chains. The dashed curve indicates the inverted luminance signal 38 yet to be corrected. And the solid lines indicate the corrected, inverted luminance signal 38a. Since the portions with the predetermined intermediate grayscale levels are truncated, the invisible light beam, which has had its intensity modulated with the inverted luminance signal 38a, are not projected to pixels with the predetermined intermediate grayscale levels. As a result, the decrease in the luminance of an image with intermediate grayscales can be minimized.

FIG. 14 shows the gamma correction processing of correcting a luminance intermediate position of an inverted luminance signal within a certain control time period. The dashed curve indicates the inverted luminance signal 38 yet to be corrected. And the solid curve indicates the corrected, inverted luminance signal 38a. If a given grayscale is equal to or higher than the middle grayscale (or luminance) level (i.e., equal to or higher than the grayscale level of 128), the grayscale level is raised. On the other hand, if a given grayscale is less than the middle grayscale level (i.e., equal to or lower than the grayscale level of 127), the grayscale level is lowered. Among other things, grayscale levels around the middle are raised or lowered to significant degrees. As a result, the decrease in the luminance of a visible light beam with intermediate grayscales can be minimized.

It should be noted that it depends on the temperature property of the photochromic compound layer whether the grayscale level should be raised or lowered in response to a temperature variation. That is why the grayscale level needs to be set according to the property.

Also, the duration of the invisible light beam can be adjusted according to the illuminance or temperature around the image projection screen 36, as well as on the image projection area 35, by changing the duties of the signal that modulates the invisible light beam.

Also, the illuminance detector 40 or the temperature detector 41 does not have to be built in the image projector 101. The inverted luminance signal correcting section 42 may make an automatic correction or a manual correction while monitoring the projected image.

Embodiment 6

Figure 15:
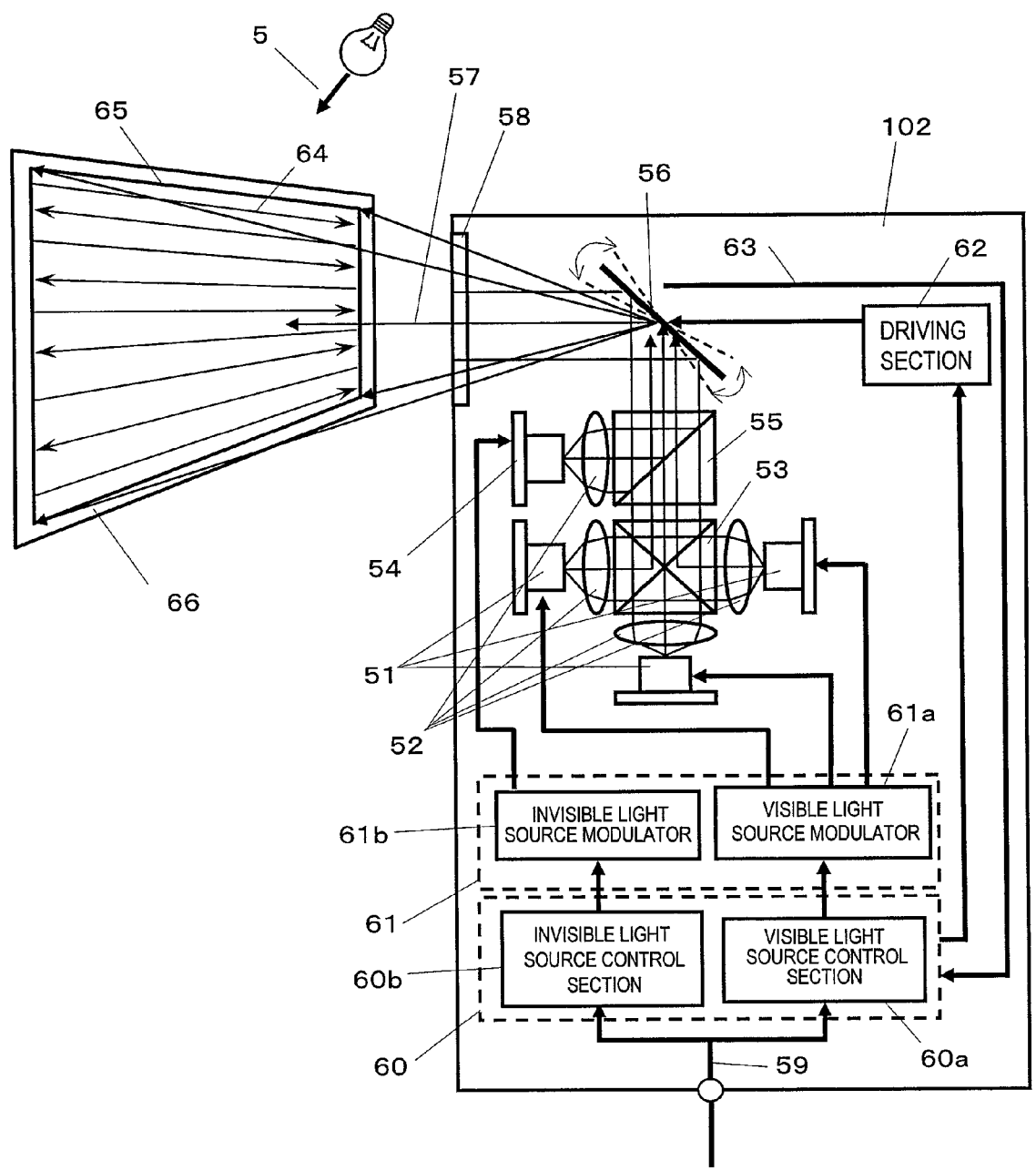
FIG. 15 illustrates an image display system as a sixth preferred embodiment of the present invention.
Figure 16:
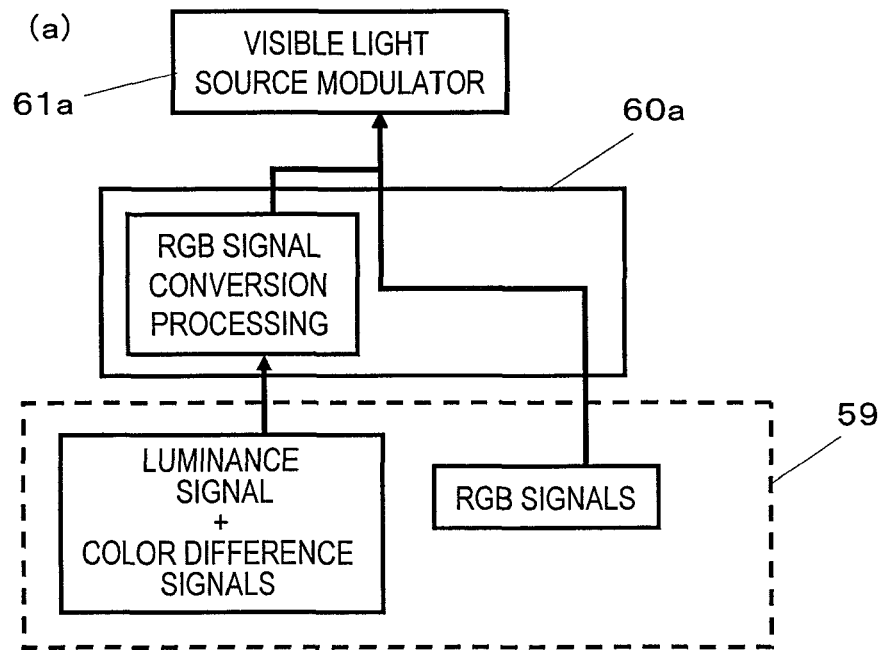
FIGS. 16(a) and 16(b) are flowcharts showing how a control section performs signal processing in the sixth preferred embodiment of the present invention.
Figure 16:
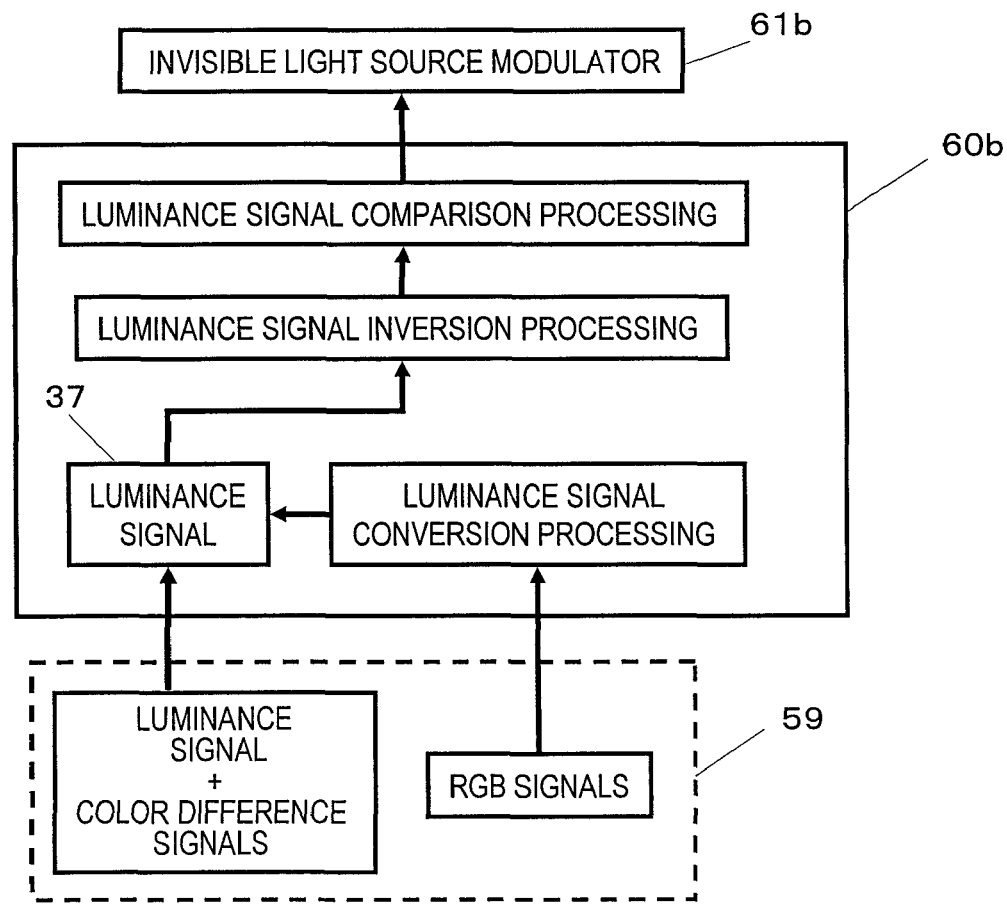
Figure 17:
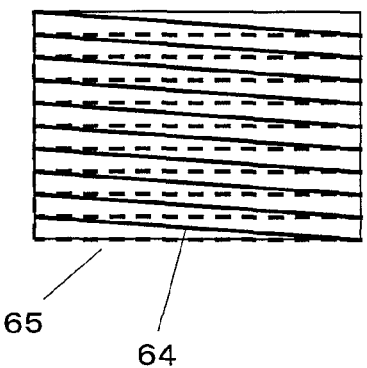
FIGS. 17(a) to 17(c) show scanning methods according to the sixth preferred embodiment of the present invention.
Figure 17:
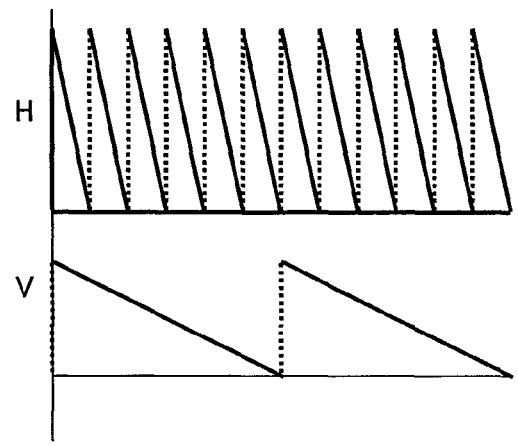
Figure 17:
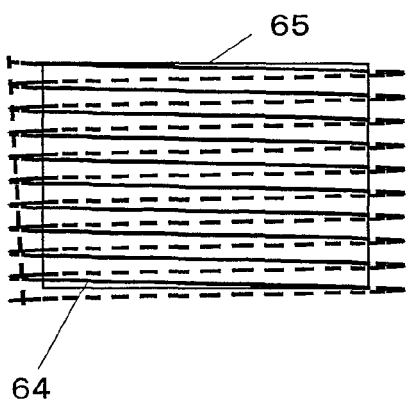
Figure 17:
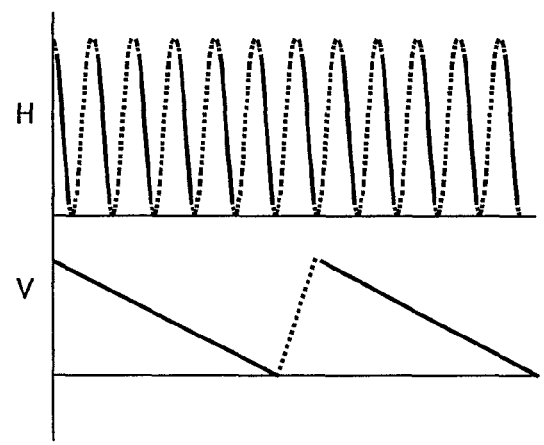
Figure 17:
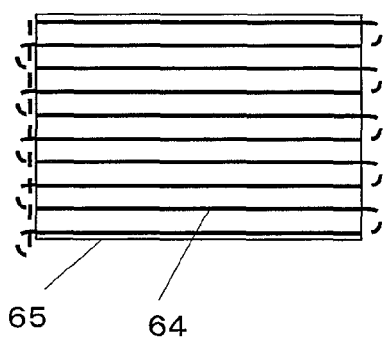
Figure 17:
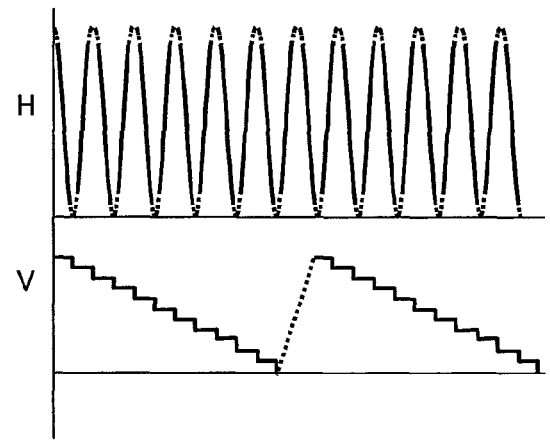

FIG. 15 illustrates an image display system as a sixth preferred embodiment of the present invention. FIG. 16 shows the flow of signal processing to be performed by a control section 60. And FIG. 17 shows the beam trajectories 64 of the scanning laser beam of a scanning section 56 and drive waveforms for the scanning section 56.

As shown in FIG. 15, the image projector 102 is a laser projector for producing an image by projecting a laser beam. The image projector 102 includes visible light sources 51, collimator lenses 52, a dichroic prism 53, an invisible light source 54, a beam splitter 55, a scanning section 56, an aperture 58, a control section 60, a light source modulator 61, and a driving section 62. The scanning section 56 includes a reflective plane that reflects and projects the visible light and invisible light that have been emitted from the light sources 51 and 54. The driving section 62 drives the scanning section 56 so as to make a scan with the laser beam.

The control section 29 includes a visible light source control section 60a and an invisible light source control section 60b. The light source modulator 61 includes a visible light source modulator 61a and an invisible light source modulator 61b. These light sources 51, 54 and the modulator 61 will be collectively referred to herein as a "modulating section".

The visible light beams that have been emitted from the three visible light sources 51 associated with R, G and B, respectively, are converged by their associated collimator lenses 52 and then combined together by the dichroic prism 53. Meanwhile, the invisible light beam emitted from the invisible light source 54 is converged by the collimator lens 52, and then combined by a beam splitter 55 with the combined visible light beam that has been produced, thereby producing a single projected beam 57. Then the light beam 57 is reflected by the mirror plane of the scanning section 56, projected through the aperture 58 onto an image projection screen 66 and makes a two-dimensional scan there, thereby forming a projection area 65.

The image signal 59 representing an image to present is input to the control sections 60a and 60b, which output a control signal, associated with the image signal 59, to the light source modulators 61a and 61b, respectively. In accordance with the control signal, the light source modulators 61a and 61b modulate the intensities of the light beams emitted from the visible and invisible light sources 51 and 54.

The visible light source control section 60a outputs the luminance signal of the image signal 59 as a control signal to the visible light source modulator 61a. The invisible light source control section 60b generates an inverted luminance signal by inverting the luminance signal of the image signal 59, and then outputs it as a control signal to the invisible light source modulator 61b.

As shown in FIG. 16(a), the flow of the signal processing performed by the visible light source control section 60a is the same as that of the signal processing shown in FIG. 7(a). If the image signal 59 is a video signal compliant with the normal NTSC standard, a luminance signal, color difference signals (including an R-luminance signal and a B-luminance signal) and an audio signal are obtained. The luminance signal can be obtained by adding together the R, G and B signals at a predetermined ratio and is represented by Equation (1). On the other hand, the respective color difference signals are represented by Equations (2) and (3). The control section 60a performs the RGB signal conversion processing represented by these Equations (1) to (3), thereby producing the R, G and B signals, which are then input to the visible light source modulator 61a.

On the other hand, if the image signal 59 is the R, G and B signals, these R, G and B signals are input to the visible light source modulator 61a.

As shown in FIG. 16(b), the flow of the signal processing performed by the invisible light source control section 60b is the same as that of the signal processing shown in FIG. 7(b). If the image signal 59 is a video signal compliant with the normal NTSC standard, a luminance signal, color difference signals and an audio signal are obtained.

The luminance signal 37 thus obtained is subjected to luminance inversion processing, thereby generating an inverted luminance signal, which is then input to the invisible light source modulator 61b.

On the other hand, if the image signal 59 is the R, G and B signals, the luminance signal is included in these R, G and B signals, and therefore, the luminance signal 37 can be obtained by adding the R, G and B signals together at the predetermined ratio represented by Equation (1). This luminance signal 37 is subjected to luminance signal inversion processing, thereby obtaining an inverted luminance signal.

FIG. 8(a) illustrates the luminance signal 37 and FIG. 8(b) illustrates the inverted luminance signal 38.

The intensities and durations of the invisible light and visible light are preferably adjusted such that the photochromic compound layer gains a color responsive to the invisible light and loses the color responsive to the visible light in an appropriate response time and at appropriate color gain and loss levels. As shown in FIG. 16(b), the control section 60b not just stores a luminance signal representing the image to present and its preceding and succeeding luminance signals but also compares those luminance signals to each other (which is luminance signal comparison processing). If it turns out, as a result of the comparison, that a dark image continues to be presented at a certain location on the display for a predetermined amount of time or more, then the invisible light beam has its intensity and duration both increased. On the other hand, if a dark image is presented for just a short time at a certain location on the display, then the invisible light beam has its intensity and duration both decreased.

As shown in FIG. 15, the projected beam 57 projected by the scanning section 56 to make a scan draws beam trajectories 64 on the projection area 65. The light beam scanning may be carried out by one of the following methods.

FIG. 17 shows beams trajectories 64 and horizontal (H) and vertical (V) drive signal waveforms according to the respective scan methods.

Specifically, FIG. 17(a) shows a linear raster scan method, in which the horizontal and vertical drive signals both have linear waveforms. When a polygon mirror device is used, this scan method is adopted. As the drive frequency is high in the horizontal direction, it is usually difficult to drive a rotating mirror linearly at high speeds. While the projection area 65 is being scanned from the top left corner toward the bottom right corner thereof, the beam trajectories 64 are obtained as indicated by the solid lines. Meanwhile, the interval in which the beam returns from the bottom right corner of the projection area 65 to the top left corner thereof is a blanking interval in which only the mirror returns to its original position without turning the light sources ON and is indicated by the dashed lines. The relation between the solid and dotted lines in the horizontal (H) and vertical (V) drive signal waveforms corresponds to the relation between the beam trajectories 64 (solid lines) and the blanking interval (dashed lines).

FIG. 17(*b*) shows a resonant raster scan method, in which the light beam makes a horizontal scan while a rotating mirror is performing a resonant operation. According to the resonant drive method, greater amplitude can be obtained with smaller force compared to a situation where the rotating mirror is driven linearly. Since the frequency is low in the vertical direction, a galvano mirror could be driven linearly.

Also, according to the resonant drive method, the mirror's operation is represented by a sine wave, the horizontal scan is made in one way, and therefore, the horizontal blanking interval becomes longer and the ON-state period of the light source gets halved. The light beam makes a scan from the top left corner of the projection area 65 toward the bottom right corner thereof. The solid lines in the projection area 65 are obtained as beam trajectories 64, while the dashed lines outside of the projection area 65 indicate the blanking interval in which the light source is turned OFF. The relation between the solid and dotted lines in the horizontal (H) and vertical (V) drive signal waveforms corresponds to the relation between the beam trajectories 64 (solid lines) and the blanking interval (dashed lines).

FIG. 17(*c*) shows a resonant raster scan method in which the horizontal scan is made in both ways. If the scan is made in both ways, the drive frequency can be halved, and therefore, the drive operation can get done more easily. In addition, compared to the method shown in FIG. 17(*b*), the ON-state period of the light source is doubled, and higher efficiency is achieved. Nevertheless, since the scan lines are not exactly parallel to each other, the scan lines need to be made parallel to each other by correcting the vertical drive signal waveform into a stepped one. The light beam makes a scan from the top left corner of the projection area 65 toward the bottom right corner thereof. The solid lines in the projection area 65 are obtained as beam trajectories 64, while the dashed lines outside of the projection area 65 indicate the blanking interval in which the light source is turned OFF. The relation between the solid and dotted lines in the horizontal (H) and vertical (V) drive signal waveforms corresponds to the relation between the beam trajectories 64 (solid lines) and the blanking interval (dashed lines).

The image projection screen 66 (see FIG. 15) may include the components shown in FIG. 4, for example.

The image projection screen 66 includes a base material layer 12 and a photochromic compound layer 13 including a transparent material deposited on the surface of the base material layer 12.

The visible light beam projected by the image projector 102 is reflected by the base material layer 12 to present an image there. On the other hand, the invisible light beam projected by the image projector 102 causes a reaction of the photochromic compound layer 13, thereby decreasing the transmittance of the visible light and increasing the absorbance.

By combining this image projector 102 with the image projection screen 66, an image display system is established.

As described above, the image projector 102 includes not only the visible light sources 51 but also the invisible light source 54. The invisible light beam is combined with the visible light beams and the resultant combined beam 57 is projected onto the image projection screen 66 by the scanning section 26. The base material layer 12 presents an image represented by the visible light beams, while the invisible light beam causes a reaction of the photochromic compound layer 13, thereby decreasing the transmittance of the visible light and increasing the absorbance thereof. If the pixels that are presenting such an image in black or in almost black correspond to the area irradiated with the visible light that should have a decreased transmittance and an increased absorbance, then the external light 5 that has been incident on that area is absorbed into the photochromic compound layer 13. As a result, an image display system, in which increase in luminance caused by the external light 5 on the screen can be minimized in the area where the image needs to be presented in black and which has an increased contrast ratio, can be obtained.

Also, the scanning section 56 does not have to be a biaxial rotating mirror device such as the one shown in FIG. 15 but may also include two uniaxial rotating mirror devices. Alternatively, the rotation around one of the two axes may be done by a rotating polygon mirror, too. Still alternatively, the rotation around one of the two axes may also be done by an optical element called a "grating light valve (GLV)", which is an element that utilizes diffraction phenomenon by arranging small strips (which are called "micro-ribbons") as an array.

It should be noted that the optical system of the image projector 102 described above is just an example. The number of the light sources used and the collimator lenses, prism and other members may be modified in various manners.

Furthermore, the invisible light that causes a reaction of the photochromic compound layer 13 may also be near-infrared light or near-ultraviolet light, not just ultraviolet light.

Also, in a scan-type image projector that presents an image by making a scan with a light beam, if a visible light beam is flickered between pixels that are arranged in the scan direction, an invisible light beam may be output while the visible light beam is not output. By changing at least one of the reflectance, transmittance and absorbance of the photochromic compound layer 13 with the invisible light beam, an image display system, in which the excessive increase in luminance caused on the screen by the external light 5 is minimized where black needs to be displayed and which has an increased contrast ratio, can be obtained.

Embodiment 7

Figure 18:
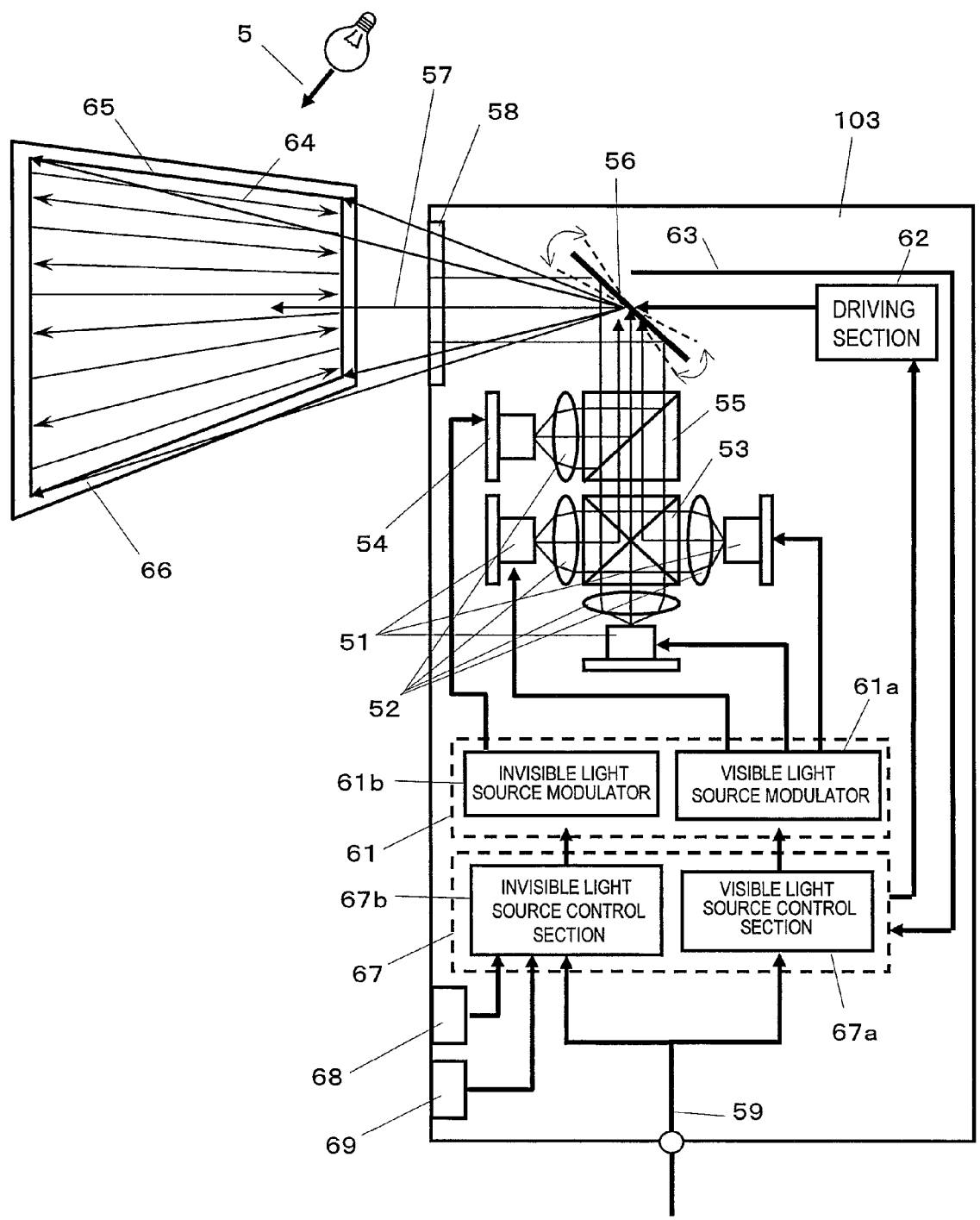
FIG. 18 illustrates an image display system as a seventh preferred embodiment of the present invention.
Figure 19:
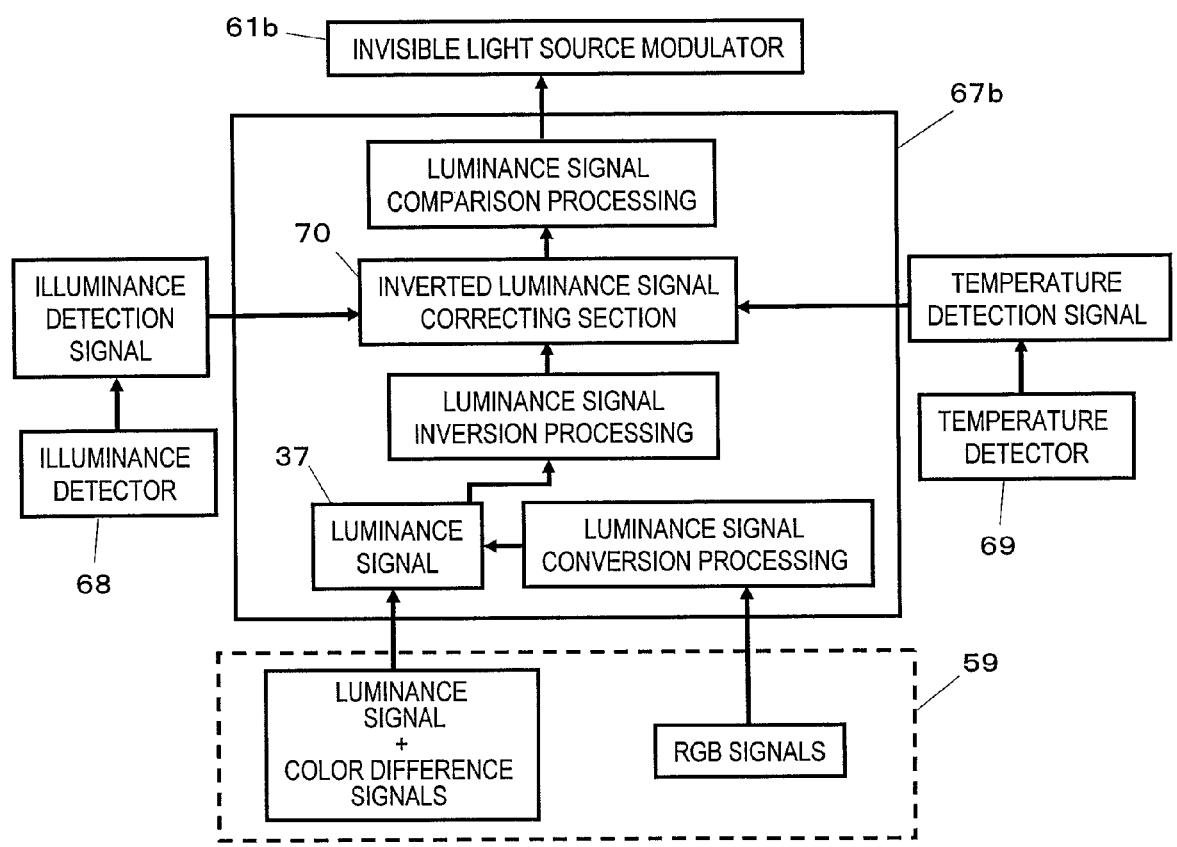
FIG. 19 is a flowchart showing how a control section performs signal processing in the seventh preferred embodiment of the present invention.

FIG. 18 illustrates an image display system as a seventh preferred embodiment of the present invention. FIG. 19 shows the flow of signal processing to be performed by the control section 67 of the image projector 103.

The image projector 103 shown in FIG. 18 includes the components to be described below.

The visible light beams that have been emitted from the three visible light sources 51 associated with R, G and B, respectively, are converged by their associated collimator lenses 52 and then combined together by the dichroic prism 53. Meanwhile, the invisible light beam emitted from the invisible light source 54 is converged by the collimator lens 52, and then combined by a beam splitter 55 with the combined visible light beam that has been produced, thereby producing a single projected beam 57. Then the light beam 57 is reflected by the mirror plane of the scanning section 56, projected through the aperture 58 onto an image projection screen 66 and makes a two-dimensional scan there, thereby forming a projection area 65.

The control section 67 includes a visible light source control section 67*a* and an invisible light source control section 67*b*. The image signal 59 representing an image to present is input to the control sections 67*a* and 67*b*, which output a control signal, associated with the image signal 59, to the visible light source modulator 61a and invisible light source modulator 61b, respectively. In accordance with the control signal, the light source modulators 61a and 61b modulate the intensities of the light beams emitted from the visible and invisible light sources 51 and 54.

The visible light source control section 67a outputs the luminance signal of the image signal 59 as a control signal to the visible light source modulator 61a. The invisible light source control section 67b generates an inverted luminance signal by inverting the luminance signal of the image signal 59, and then outputs it as a control signal to the invisible light source modulator 61b.

The image projector 103 further includes an illuminance detector 68 and a temperature detector 69. The illuminance detector 68 detects the illuminance around the image projection screen 66, as well as on the image projection area 65, and outputs an illuminance detection signal, representing the illuminance detected, to the invisible light source control section 67b.

On the other hand, the temperature detector 69 detects the temperature around the image projection screen 66, as well as on the image projection area 65, and outputs a temperature detection signal, representing the temperature detected, to the invisible light source control section 67b.

The illuminance detector 68 or the temperature detector 69 detects the illuminance or the temperature when the image projector 103 is turned ON, before the image is projected, and/or while the image is being projected.

The flow of the signal processing performed by the visible light source control section 67a is the same as that of the signal processing shown in FIG. 7(a). If the image signal 59 is a video signal compliant with the normal NTSC standard, a luminance signal, color difference signals (including an R-luminance signal and a B-luminance signal) and an audio signal are obtained. The luminance signal can be obtained by adding together the R, G and B signals at a predetermined ratio and is represented by Equation (1). On the other hand, the respective color difference signals are represented by Equations (2) and (3). The control section 67a performs the RGB signal conversion processing represented by these Equations (1) to (3), thereby producing the R, G and B signals, which are then input to the visible light source modulator 61a.

On the other hand, if the image signal 59 is the R, G and B signals, these R, G and B signals are input to the visible light source modulator 61a.

Next, it will be described with reference to the signal processing flow shown in FIG. 19 how the invisible light source control section 67b performs its signal processing.

The invisible light source control section 67b performs quite the same processing as the one that has already been described with reference to FIG. 7(b) until the luminance signal is inverted. If the image signal 59 is a video signal compliant with the normal NTSC standard, the luminance signal 37 is obtained. Thus, the control section 67b subjects this luminance signal 37 to inversion processing, thereby obtaining an inverted luminance signal.

On the other hand, if the image signal 59 is the R, G and B signals, the luminance signal is included in these R, G and B signals, and therefore, the luminance signal 37 can be obtained by adding the R, G and B signals together at the predetermined ratio represented by Equation (1). This luminance signal 37 is subjected to inversion processing, thereby obtaining an inverted luminance signal.

FIG. 8(a) illustrates the luminance signal 37 and FIG. 8(b) illustrates the inverted luminance signal 38.

The intensities and durations of the invisible light and visible light are preferably adjusted such that the photochromic compound layer gains a color responsive to the invisible light and loses the color responsive to the visible light in an appropriate response time and at appropriate color gain and loss levels. As shown in FIG. 19, the control section 67b not just stores a luminance signal representing the image to present and its preceding and succeeding luminance signals but also compares those luminance signals to each other (which is luminance signal comparison processing). If it turns out, as a result of the comparison, that a dark image continues to be presented at a certain location on the display for a predetermined amount of time or more, then the invisible light beam has its intensity and duration both increased. On the other hand, if a dark image is presented for just a short time at a certain location on the display, then the invisible light beam has its intensity and duration both decreased.

The invisible light source control section 67b includes an inverted luminance signal correcting section 70. The inverted luminance signal 38 is input to the inverted luminance signal correcting section 70, where the grayscale levels are corrected, thereby obtaining an inverted luminance signal to drive the invisible light source 25. Then, this inverted luminance signal is input to the invisible light source modulator 61b. Hereinafter, the correction processing performed by the inverted luminance signal correcting section 70 will be described with reference to FIG. 11.

FIG. 11 shows an inverted luminance signal yet to be corrected and a corrected inverted luminance signal in a situation where the grayscale levels (i.e., luminance levels) are corrected within a certain control time period. In FIG. 11, the dashed curve represents the inverted luminance signal 38 before the grayscale levels are corrected, while the solid curve represents the inverted luminance signal 38a after the grayscale levels have been corrected. According to the illuminance detected by the illuminance detector 68, the grayscale levels are decreased uniformly by a predetermined magnitude.

The illuminance detection signal is output from the illuminance detector 68 to the inverted luminance signal correcting section 70, where the luminance levels (i.e., grayscale levels) of the inverted luminance signal to control the light source modulator 61b are corrected in accordance with the illuminance detection signal.

The temperature detection signal is output from the temperature detector 69 to the inverted luminance signal correcting section 70, where the luminance levels (i.e., grayscale levels) of the inverted luminance signal to control the light source modulator 61b are corrected in accordance with the temperature detection signal.

As shown in FIG. 18, the projected beam 57 projected by the scanning section 56 to make a scan draws beam trajectories 64 on the projection area 65. The light beam scanning may be carried out by one of the methods that have already been described with reference to FIG. 17.

Specifically, FIG. 17(a) shows a linear raster scan method, in which the horizontal and vertical drive signals both have linear waveforms. When a polygon mirror device is used, this scan method is adopted. As the drive frequency is high in the horizontal direction, it is usually difficult to drive a rotating mirror linearly at high speeds. While the projection area 65 is being scanned from the top left corner toward the bottom right corner thereof, the beam trajectories 64 are obtained as indicated by the solid lines. Meanwhile, the interval in which the beam returns from the bottom right corner of the projection area 65 to the top left corner thereof is a blanking interval in which only the mirror returns to its original position without turning the light sources ON and is indicated by the dashed lines. The relation between the solid and dotted lines in the horizontal (H) and vertical (V) drive signal waveforms corresponds to the relation between the beam trajectories 64 (solid lines) and the blanking interval (dashed lines).

FIG. 17(*b*) shows a resonant raster scan method, in which the light beam makes a horizontal scan while a rotating mirror is performing a resonant operation. According to the resonant drive method, greater amplitude can be obtained with smaller force compared to a situation where the rotating mirror is driven linearly. Since the frequency is low in the vertical direction, a galvano mirror could be driven linearly.

Also, according to the resonant drive method, the mirror's operation is represented by a sine wave, the horizontal scan is made in one way, and therefore, the horizontal blanking interval becomes longer and the ON-state period of the light source gets halved. The light beam makes a scan from the top left corner of the projection area 65 toward the bottom right corner thereof. The solid lines in the projection area 65 are obtained as beam trajectories 64, while the dashed lines outside of the projection area 65 indicate the blanking interval in which the light source is turned OFF. The relation between the solid and dotted lines in the horizontal (H) and vertical (V) drive signal waveforms corresponds to the relation between the beam trajectories 64 (solid lines) and the blanking interval (dashed lines).

FIG. 17(*c*) shows a resonant raster scan method in which the horizontal scan is made in both ways. If the scan is made in both ways, the drive frequency can be halved, and therefore, the drive operation can get done more easily. In addition, compared to the method shown in FIG. 17(*b*), the ON-state period of the light source is doubled, and higher efficiency is achieved. Nevertheless, since the scan lines are not exactly parallel to each other, the scan lines need to be made parallel to each other by correcting the vertical drive signal waveform into a stepped one. The light beam makes a scan from the top left corner of the projection area 65 toward the bottom right corner thereof. The solid lines in the projection area 65 are obtained as beam trajectories 64, while the dashed lines outside of the projection area 65 indicate the blanking interval in which the light source is turned OFF. The relation between the solid and dotted lines in the horizontal (H) and vertical (V) drive signal waveforms corresponds to the relation between the beam trajectories 64 (solid lines) and the blanking interval (dashed lines).

The image projection screen 66 (see FIG. 18) may include the components shown in FIG. 4, for example.

The image projection screen 66 includes a base material layer 12 and a photochromic compound layer 13 including a transparent material deposited on the surface of the base material layer 12.

The visible light beam projected by the image projector 103 is reflected by the base material layer 12 to present an image there. On the other hand, the invisible light beam projected by the image projector 103 causes a reaction of the photochromic compound layer 13, thereby decreasing the transmittance of the visible light and increasing the absorbance.

By combining this image projector 103 with the image projection screen 66, an image display system is established.

As described above, the image projector 103 includes not only the visible light sources 51 but also the invisible light source 54. The invisible light beam is combined with the visible light beams and the resultant combined beam 57 is projected by the scanning section 26 onto the image projection screen 66. The base material layer 12 presents an image represented by the visible light beams, while the invisible light beam causes a reaction of the photochromic compound layer 13, thereby decreasing the transmittance of the visible light and increasing the absorbance thereof. If the pixels that are presenting such an image in black or in almost black correspond to the area irradiated with the visible light that should have a decreased transmittance and an increased absorbance, then the external light 5 that has been incident on that area is absorbed into the photochromic compound layer 13. As a result, an image display system, in which increase in luminance caused on the screen by the external light 5 can be minimized in the area where the image needs to be presented in black and which has an increased contrast ratio, can be obtained. In addition, according to this preferred embodiment, the inverted luminance signal correcting section 70 corrects the inverted luminance signal 38 appropriately according to the environment surrounding the projector, thereby further reducing the unwanted increase in the luminance of black portions on the screen and increasing the contrast ratio.

Also, the scanning section 56 does not have to be a biaxial rotating mirror device such as the one shown in FIG. 18 but may also include two uniaxial rotating mirror devices. Alternatively, the rotation around one of the two axes may be done by a rotating polygon mirror, too. Still alternatively, the rotation around one of the two axes may also be done by an optical element called a "grating light valve (GLV)".

It should be noted that the optical system of the image projector 103 described above is just an example. The number of the light sources used and the collimator lenses, prism and other members may be modified in various manners.

Furthermore, the invisible light that causes a reaction of the photochromic compound layer 13 may also be near-infrared light or near-ultraviolet light, not just ultraviolet light.

The grayscale levels (luminance levels) are supposed to be corrected by decreasing the levels uniformly by a predetermined magnitude. However, this is just an example. Actually, as the grayscale levels are corrected according to the luminance around the image projection screen 66, as well as on the projection area 65, the grayscale levels may sometimes be increased uniformly by a predetermined magnitude.

Methods of correcting an inverted luminance signal include a correction of truncating portions of the inverted luminance signal that are equal to or lower than a predetermined luminance level, a correction of truncating only portions with predetermined intermediate luminance levels, and a gamma correction for correcting either a luminance level that exceeds a grayscale level or a luminance intermediate position. These correction processes performed by the inverted luminance signal correcting section 70 will be described with reference to FIGS. 12 through 14.

FIG. 12 shows the correction processing of truncating portions of the inverted luminance signal that are equal to or lower than a predetermined grayscale level (or luminance level) within a certain control time period. The one-dot chain indicates the predetermined grayscale level. The dashed curve indicates the inverted luminance signal 38 yet to be corrected. And the solid lines indicate the corrected, inverted luminance signal 38*a*. Since the portions that are equal to or lower than the predetermined grayscale level are truncated, the invisible light beam, which has had its intensity modulated with the inverted luminance signal 38*a*, gets projected only to pixels that represent an image in black or almost black. As a result, the transmittance of visible light can be decreased and the absorbance thereof can be increased.

FIG. 13 shows the correction processing of truncating portions of the inverted luminance signal with predetermined intermediate grayscale levels (or luminance levels) within a certain control time period. The predetermined intermediate grayscale levels are defined by the upper and lower one-dot chains. The dashed curve indicates the inverted luminance signal 38 yet to be corrected. And the solid lines indicate the corrected, inverted luminance signal 38a. Since the portions with the predetermined intermediate grayscale levels are truncated, the invisible light beam, which has had its intensity modulated with the inverted luminance signal 38a, are not projected to pixels with the predetermined intermediate grayscale levels. As a result, the decrease in the luminance of an image with intermediate grayscales can be minimized.

FIG. 14 shows the gamma correction processing of correcting a luminance intermediate position of an inverted luminance signal within a certain control time period. The dashed curve indicates the inverted luminance signal 38 yet to be corrected. And the solid curve indicates the corrected, inverted luminance signal 38a. If a given grayscale is equal to or higher than the middle grayscale (or luminance) level (i.e., equal to or higher than the grayscale level of 128), the grayscale level is raised. On the other hand, if a given grayscale is less than the middle grayscale level (i.e., equal to or lower than the grayscale level of 127), the grayscale level is lowered. Among other things, grayscale levels around the middle are raised or lowered to significant degrees. As a result, the decrease in the luminance of a visible light beam with intermediate grayscales can be minimized.

It should be noted that it depends on the temperature property of the photochromic compound layer whether the grayscale level should be raised or lowered in response to a temperature variation. That is why the grayscale level needs to be set according to the property.

Also, the duration of the invisible light beam can be adjusted according to the illuminance or temperature around the image projection screen 66, as well as on the image projection area 65, by changing the duties of the signal that modulates the invisible light beam.

Also, the illuminance detector 68 or the temperature detector 69 does not have to be built in the image projector 103. The inverted luminance signal correcting section 70 may make an automatic correction or a manual correction while monitoring the projected image.

Figure 20:
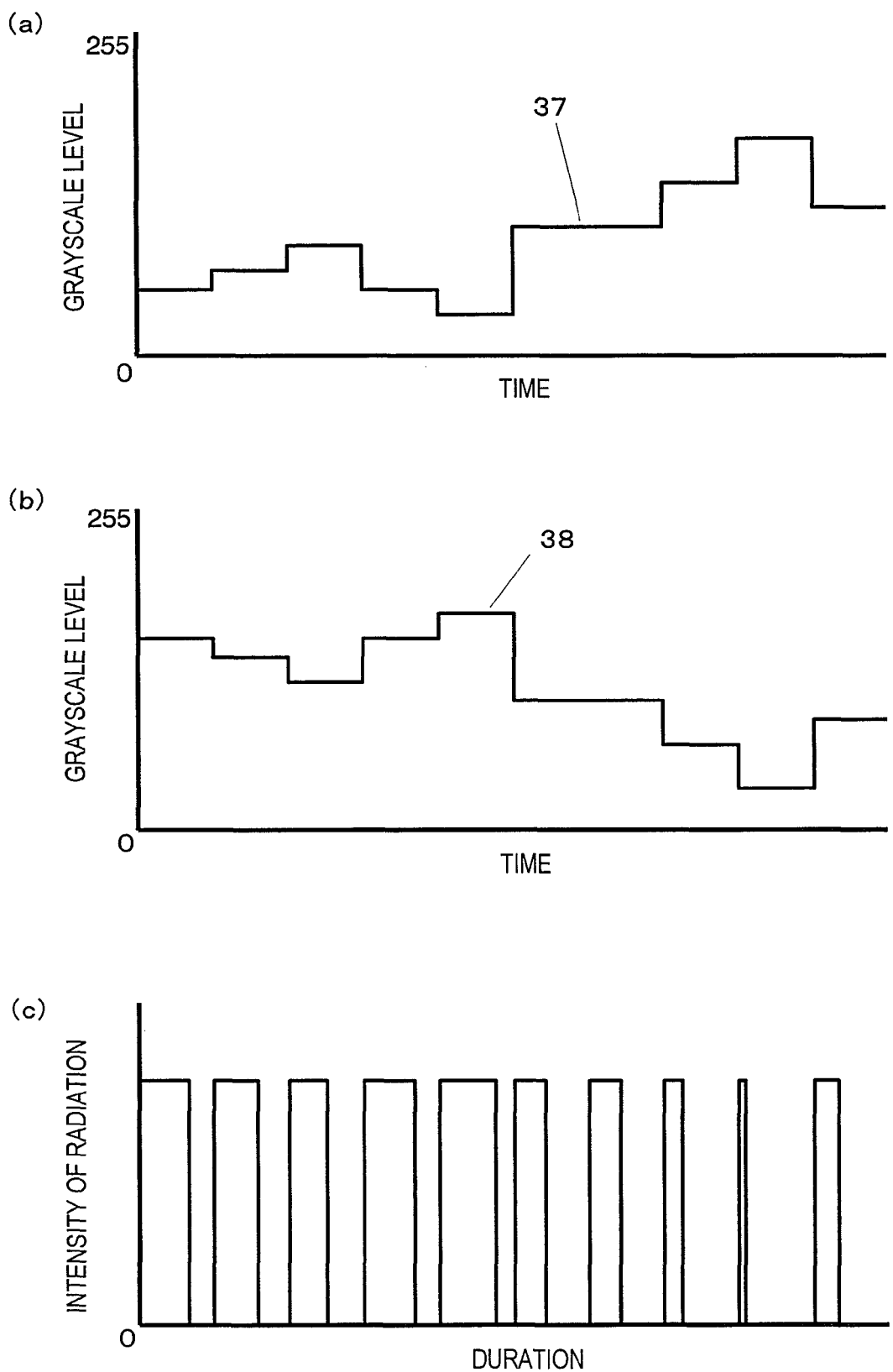
FIGS. 20(a) to 20(c) show timings to emit invisible light and its duration and intensity in the seventh preferred embodiment of the present invention.

Hereinafter, the luminance signal comparison processing that has already been described with reference to FIGS. 7(b), 10, 16(b) and 19 will be further described with reference to FIG. 20.

Specifically, FIG. 20(a) shows the luminance signal 37. FIG. 20(b) shows the inverted luminance signal 38. And FIG. 20(c) shows the timings to emit the invisible light beams and their durations and intensities. In the foregoing description, the length of time in which a dark image continues to be presented at a certain display location is calculated by comparing the luminance signals to each other and the intensities and durations of the invisible light beams are adjusted based on that length. Alternatively, as shown in FIG. 20(c), the invisible light beams may be output only when a dark image continues to be presented for a predetermined amount of time or more at a certain display location but do not have to be output otherwise. In that case, even if the response of the photochromic compound itself is slower than the required response time, black display is realized at an acceptable level to the naked eyes.

Also, in a scan-type image projector that presents an image by making a scan with a light beam, the invisible light beam may be output between pixels to which no visible light beams are output. By changing at least one of the reflectance, transmittance and absorbance of the photochromic compound layer 13 with the invisible light beam, an image display system, in which the excessive increase in luminance caused on the screen by the external light 5 is minimized where black needs to be displayed and which has an increased contrast ratio, can be obtained.

The present invention can be used no less effectively to present a still picture than to present a moving picture, and contributes to presenting an image at a high contrast ratio with the increase in luminance minimized where black needs to be displayed even in an environment where the ambient light is non-controllable such as outdoors, at a railroad station and at an underground shopping mall.

INDUSTRIAL APPLICABILITY

The present invention is particularly effectively applicable to the fields of technology of an image projector for presenting an image on a screen by a projection method, a screen on which an image is presented, and an image display system including such a projector and such a screen.

The invention claimed is:

1. An image projector comprising a first light source that emits visible light and a second light source that emits invisible light and projecting the visible light and the invisible light onto a screen,
   wherein the screen includes a material, at least one of the visible light reflectance, transmittance and absorbance of which changes when irradiated with the invisible light projected, and
   wherein the image projector further includes:
   a modulating section for modulating the intensities of the visible light and invisible light based on an image signal; and
   a control section for controlling the modulating section, and
   wherein the control section includes a visible light source control section and an invisible light source control section, and
   wherein the invisible light source control section includes a correcting section for correcting an inverted luminance signal, which is obtained by inverting a luminance signal associated with the image signal, and
   wherein the correcting section makes at least one correction selected from the group consisting of: a correction to the luminance level of the inverted luminance signal; the correction of truncating portions of the inverted luminance signal that have a predetermined luminance level or less; and the correction of truncating portions of the inverted luminance signal that have predetermined intermediate luminance levels.

2. The image projector of claim 1, wherein the modulating section modulates the intensity of the invisible light based on a luminance signal associated with the image signal.

3. The image projector of claim 2, wherein the image signal is RGB signals, and
   wherein the control section converts the RGB signals into the luminance signal.

4. The image projector of claim 1, further comprising at least one of an illuminance detecting section for detecting an illuminance at an image projection area and a temperature detecting section for detecting a temperature at the image projection area,
   wherein the correcting section corrects the inverted luminance signal based on at least one of the illuminance and temperature at the image projection area.

5. The image projector of claim 1, further comprising at least one of an illuminance detecting section for detecting an illuminance at an image projection area and a temperature detecting section for detecting a temperature at the image projection area,
    wherein the control section adjusts at least one of the energy and duration of the projected invisible light based on at least one of the illuminance and temperature at the image projection area.

6. The image projector of claim 1, further comprising:
a scanning section with a reflective plane for reflecting and projecting the visible light and invisible light that have been emitted from the first and second light sources; and
a driving section for driving the scanning section.

7. The image projector of claim 1, wherein the material included in the screen is a photochromic compound.

8. The image projector of claim 7, wherein the photochromic compound includes a transparent material.

9. The image projector of claim 7, wherein the photochromic compound includes an opaque material.

10. The image projector of claim 1, wherein at least one of the reflectance, transmittance and absorbance of the screen varies with the energy of the invisible light projected.

11. The image projector of claim 1, wherein at least one of the reflectance, transmittance and absorbance of the screen varies with the duration of the invisible light projected.

12. The image projector of claim 1, wherein the screen includes the material on the projection side thereof and/or its reverse side.

13. An image display system comprising the image projector of claim 1 and the screen.

* * * * *